US010261674B2

(12) United States Patent
Paek et al.

(10) Patent No.: US 10,261,674 B2
(45) Date of Patent: Apr. 16, 2019

(54) DISPLAY-EFFICIENT TEXT ENTRY AND EDITING

(71) Applicant: Microsoft Technology Licensing, LLC, Redmond, WA (US)

(72) Inventors: Timothy Paek, Sammamish, WA (US); Dmytro Rudchenko, Bellevue, WA (US); Vishwas Kulkarni, Woodinville, WA (US); Asela Jeevaka Ranaweera Gunawardana, Seattle, WA (US); Jason Grieves, Bellevue, WA (US); Daniel Ostrowski, Seattle, WA (US); Amish Patel, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 208 days.

(21) Appl. No.: 14/555,502

(22) Filed: Nov. 26, 2014

(65) Prior Publication Data
US 2016/0070441 A1    Mar. 10, 2016

Related U.S. Application Data

(60) Provisional application No. 62/046,883, filed on Sep. 5, 2014.

(51) Int. Cl.
*G06F 17/00* (2006.01)
*G06F 3/0484* (2013.01)
(Continued)

(52) U.S. Cl.
CPC ........ *G06F 3/04842* (2013.01); *G06F 3/0237* (2013.01); *G06F 3/0482* (2013.01);
(Continued)

(58) Field of Classification Search
CPC ............... G06F 3/0489; G06F 3/09886; G06F 3/04886; G06F 3/04842; G06F 3/0237; G06F 3/0485
(Continued)

(56) References Cited

U.S. PATENT DOCUMENTS 5,546,538 A * 8/1996 Cobbley ............... G06F 3/0488
382/187
6,073,146 A * 6/2000 Chen ................... G06F 17/2863
704/3
(Continued)

FOREIGN PATENT DOCUMENTS

| CN | 101393506 A | 3/2009 |
| CN | 103576792 A | 2/2014 |
| WO | 2011113057 A1 | 9/2011 |

OTHER PUBLICATIONS

Clark et al., What Do We Want from a Wearable User Interface, Citeseer 200, pp. 1-6.*
(Continued)

*Primary Examiner* — Cong-Lac Huynh
(74) *Attorney, Agent, or Firm* — Alleman Hall Creasman & Tuttle LLP

(57) ABSTRACT

Embodiments are disclosed for a method of providing a user interface on a computing device. The method includes presenting a virtual keyboard on a display of the computing device, detecting input to the virtual keyboard. The method further includes, for each detected input, determining whether the input selects any of one or more delimiter keys, displaying a placeholder for the input responsive to the input not selecting any of the one or more delimiter keys, and receiving suggested candidate text from a word-level recognizer and replacing all currently displayed placeholders
(Continued)

with the suggested candidate text responsive to the input selecting any of the one or more delimiter keys.

20 Claims, 20 Drawing Sheets

(51) Int. Cl.

| | | |
|---|---|---|
| *G06F 3/0488* | (2013.01) | |
| *G06F 3/0482* | (2013.01) | |
| *G06F 17/27* | (2006.01) | |
| *G06F 3/023* | (2006.01) | |
| *G06F 3/0483* | (2013.01) | |
| *G06F 3/0485* | (2013.01) | |
| *H04M 1/725* | (2006.01) | |
| *G10L 25/48* | (2013.01) | |
| *G06F 1/16* | (2006.01) | |
| *G10L 15/26* | (2006.01) | |
| *G10L 15/00* | (2013.01) | |

(52) U.S. Cl.
CPC .......... *G06F 3/0483* (2013.01); *G06F 3/0485* (2013.01); *G06F 3/04883* (2013.01); *G06F 3/04886* (2013.01); *G06F 17/273* (2013.01); *G10L 25/48* (2013.01); *H04M 1/72552* (2013.01); *G06F 1/163* (2013.01); *G10L 15/00* (2013.01); *G10L 15/26* (2013.01); *H04M 1/7253* (2013.01); *H04M 2250/70* (2013.01)

(58) Field of Classification Search
USPC .................................................. 715/273, 773
See application file for complete search history.

(56) References Cited

U.S. PATENT DOCUMENTS

| | | | | |
|---|---|---|---|---|
| 8,866,748 | B2 * | 10/2014 | Sirpal | G06F 1/1616 |
| | | | | 345/169 |
| 9,047,268 | B2 * | 6/2015 | Ouyang | G06F 3/0237 |
| 9,165,257 | B2 * | 10/2015 | Badger | G06F 3/0237 |
| 9,420,089 | B1 * | 8/2016 | Rao | G06F 21/32 |
| 9,665,276 | B2 * | 5/2017 | Bi | G06F 3/04886 |
| 2002/0072918 | A1 * | 6/2002 | White | G10L 15/30 |
| | | | | 704/270.1 |
| 2008/0077393 | A1 * | 3/2008 | Gao | G06F 3/018 |
| | | | | 704/8 |
| 2008/0220718 | A1 * | 9/2008 | Sakamoto | H04B 1/385 |
| | | | | 455/41.2 |
| 2009/0276839 | A1 * | 11/2009 | Peneder | G06F 21/31 |
| | | | | 726/8 |
| 2011/0098583 | A1 | 4/2011 | Pandia et al. | |
| 2011/0302532 | A1 * | 12/2011 | Missig | G06F 3/0416 |
| | | | | 715/823 |
| 2012/0131501 | A1 * | 5/2012 | Lazaridis | G06F 3/0488 |
| | | | | 715/804 |
| 2012/0249596 | A1 | 10/2012 | Colley | |
| 2012/0328187 | A1 * | 12/2012 | Vuleta | G06F 17/211 |
| | | | | 382/164 |
| 2013/0002559 | A1 | 1/2013 | Vardi | |
| 2013/0045037 | A1 | 2/2013 | Schaffer | |
| 2013/0120267 | A1 * | 5/2013 | Pasquero | G06F 17/276 |
| | | | | 345/168 |
| 2013/0169540 | A1 | 7/2013 | Dinh | |
| 2013/0205244 | A1 * | 8/2013 | Decker | G06F 17/21 |
| | | | | 715/777 |
| 2013/0212515 | A1 * | 8/2013 | Eleftheriou | G06F 3/04886 |
| | | | | 715/773 |
| 2013/0263039 | A1 * | 10/2013 | Fahlgren | G06F 3/0489 |
| | | | | 715/780 |
| 2013/0298071 | A1 * | 11/2013 | Wine | G06F 3/04883 |
| | | | | 715/780 |
| 2013/0326392 | A1 * | 12/2013 | Maltesson | G06F 3/0488 |
| | | | | 715/780 |
| 2013/0346168 | A1 | 12/2013 | Zhou et al. | |
| 2014/0019253 | A1 * | 1/2014 | Ricasata | G06Q 30/0241 |
| | | | | 705/14.64 |
| 2014/0053098 | A1 * | 2/2014 | Leyon | G06F 21/31 |
| | | | | 715/780 |
| 2014/0055343 | A1 | 2/2014 | Kim | |
| 2014/0108925 | A1 * | 4/2014 | Zhai | G06F 17/24 |
| | | | | 715/271 |
| 2014/0109024 | A1 * | 4/2014 | Miyazaki | G06F 3/04883 |
| | | | | 715/863 |
| 2014/0129974 | A1 * | 5/2014 | Ben-Harrush | G06F 3/0484 |
| | | | | 715/781 |
| 2014/0139637 | A1 | 5/2014 | Mistry et al. | |
| 2014/0157191 | A1 * | 6/2014 | Shiplacoff | G06F 3/0483 |
| | | | | 715/788 |
| 2014/0160055 | A1 | 6/2014 | Margolis et al. | |
| 2014/0173494 | A1 * | 6/2014 | Goldsmith | G06F 3/0237 |
| | | | | 715/773 |
| 2014/0241540 | A1 | 8/2014 | Hodges et al. | |
| 2014/0259154 | A1 * | 9/2014 | Finlow-Bates | G06F 21/31 |
| | | | | 726/19 |
| 2015/0065893 | A1 * | 3/2015 | Ye | A61B 5/6898 |
| | | | | 600/483 |
| 2015/0154412 | A1 * | 6/2015 | Nakaizawa | G06F 3/0488 |
| | | | | 358/1.14 |
| 2015/0169975 | A1 * | 6/2015 | Kienzle | G06K 9/34 |
| | | | | 382/189 |
| 2015/0294098 | A1 * | 10/2015 | Suwa | G06F 21/32 |
| | | | | 726/19 |
| 2015/0323998 | A1 * | 11/2015 | Kudekar | G06F 1/163 |
| | | | | 345/156 |
| 2015/0378599 | A1 * | 12/2015 | Lee | G06F 3/04886 |
| | | | | 715/773 |
| 2016/0011766 | A1 * | 1/2016 | Kosaka | G06F 3/04855 |
| | | | | 715/787 |
| 2016/0042165 | A1 * | 2/2016 | Nicholson | G06F 21/32 |
| | | | | 726/19 |
| 2016/0156615 | A1 * | 6/2016 | Arai | H04L 63/083 |
| | | | | 726/4 |
| 2016/0266891 | A1 * | 9/2016 | Phipps | G06Q 10/0637 |
| 2016/0378336 | A1 * | 12/2016 | Katsuyama | G06F 3/04883 |
| | | | | 345/472 |
| 2017/0038967 | A1 * | 2/2017 | Sotnikov | G06F 3/04886 |
| 2017/0315719 | A1 * | 11/2017 | Couelier | G06F 3/0481 |
| 2018/0129897 | A1 * | 5/2018 | Hinckley | G06K 9/00416 |

OTHER PUBLICATIONS

Medjahed et al., Human Activities of Daily Living Recognition Using Fuzzy Logic for Elderly Home Monitoring, IEEE 2009, pp. 2001-2006.*

Weir et al., Uncertain Text Entry on Mobile Devices, ACM 2014, pp. 2307-2316.*

Xiao et al., Expanding the Input Expressivity of Smartwatches with Mechanical Pan, Twist, Tilt and Click, ACM 2014, pp. 193-196.*

Ahmad et al., A Keystroke and Pointer Control Input Interface for Wearable Computers, IEEE 2006, pp. 1-10.*

Fuccella et al., Gestures and Widgets: Performance in Text Editing on Multi-Touch Capable Mobile Devices, ACM 2013, pp. 2785-2794.*

Funk et al., Using a Touch-Sensitive Wristband for Text Entry on Smart Watches, Google 2014, pp. 2306-2311.*

Wiedenbeck et al., PassPoints: Design and Longitudinal Evaluation of a Graphical Password System, Science Direct 2005, pp. 102-127.*

Bunke, Recognition of Cursive Roman Handwriting—Past, Present and Future, IEEE 2003, pp. 1-12.*

Manmatha et al., Word Spotting: A New Approach to Indexing Handwriting, IEEE 1996, pp. 631-637.*

Rick, Performance Optimizations of Virtual Keyboards for Stroke-based Text Entry on a Touch-based Tabletop, ACM 2010, pp. 77-86. (Year: 2010).*

(56) References Cited

OTHER PUBLICATIONS

Olberding et al., AugmentedForearm: Exploring the Design Space of a Display-enhanced Forearm, ACM 2013, pp. 9-12. (Year: 2013).*

Talshum's Channel, "Full Screen Keyboard-Super Keyboard," Retrieved from https://www.youtube.com/watch?v=Cba_gDNrsGk, Uploaded Jul. 10, 2010, 1 Page.

Blindtype, "BlindType on Android," Retrieved from https://www.youtube.com/watch?v=m6eKm1gUnTE, Uploaded Aug. 7, 2010, 8 Pages.

Opinionativereviewer, "Keyboard2 iPhone App Review," Retrieved from https://www.youtube.com/watch?v=8MRHeUPaw3Q, Uploaded Apr. 2, 2011, 8 Pages.

USA European Patent Office, International Search Report and Written Opinion Issued in Application No. PCT/US2015/048445, dated Feb. 24, 2016, WIPO, 21 Pages.

"Will we Type with Virtual Keyboards on Smart Watches?", Published on: May 17, 2013 Available at: http://www.atelier.net/en/trends/articles/will-we-type-virtual-keyboards-smart-watches_419585.

Scaramuzzino, Paolo, "Evolution or Revolution?", Published on: Jun. 24, 2014 Available at: https://www.linkedin.com/today/post/article/20140624101302-74188167-evolution-or-revolution.

Smith, Dave, "Android Wear is great, but Google's Smartwatches are Sorely Lacking in the Hardware Department", Published on: Aug. 9, 2014 Available at: http://www.businessinsider.in/Android-Wear-Is-Great-But-Googles-Smartwatches-Are-Sorely-Lacking-In-The-Hardware-Department/articleshow/39964216.cms.

Lomas, et al., "5-Tiles Keyboard Targets Wearables to Hunt the Post-Qwerty Holy Grail", Published on: May 24, 2014 Available at: http://techcrunch.com/2014/05/24/5-tiles-keyboard/.

Shah, Agam, "Cloud-savvy Bluetooth 4.1 to reach devices by year end", Published on: Apr. 25, 2014 Available at: http://www.computerworld.com/article/2488702/wireless-networking/cloud-savvy-bluetooth-4-1-to-reach-devices-by-year-end.html.

Smith, Mat, "Minuum's Android Wear Keyboard Makes Smartwatch Typing a Fidgety Reality", Published on: Jul. 16, 2014 Available at: http://www.engadget.com/2014/07/16/minuum-android-wear-keyboard/.

Brian, Matt, "Fleksy Brings a Predictive Messaging App to the Gear 2 Smartwatch", Published on: Jun. 18, 2014 Available at: http://www.engadget.com/2014/06/18/fleksy-messenger-app-gear-2-tizen/.

Wollman, Dana, "Samsung Gear S preview: What's it like to type emails on a 2-inch screen?" Published on: Sep. 3, 2014 Available at: http://www.engadget.com/2014/09/03/samsung-gear-s-hands-on/.

Fingas, Jon, "TomTom's new GPS watches track your heart rate without a chest strap (update: US pricing)", http://www.engadget.com/2014/04/03/tomtom-cardio-gps-watches/, Apr. 3, 2014, 10 pages.

Goode, Lauren, "Samsung's New Gear Fit Needs to Work on the "Fit" Part", http://recode.net/2014/04/08/samsungs-new-gear-fit-needs-to-work-on-the-fit-part/, Apr. 8, 2014, 10 pages.

"Samsung Gear Fit, Gear 2 and Gear 2 Neo go on sale worldwide", NDTV Gadgets, http://gadgets.ndtv.com/others/news/samsung-gear-fit-gear-2-and-gear-2-neo-go-on-sale-worldwide-507220, Apr. 11, 2014, 3 pages.

Poeter, Damon, "Meet Simband, Samsung's Next-Gen Health Tracker", http://www.pcmag.com/article2/0,2817,2458663,00.asp, May 28, 2014, 5 pages.

"First Office Action and Search Report Issued in Chinese Patent Application No. 201580047733.3", dated Jul. 18, 2018, 21 Pages.

* cited by examiner

DISPLAY-EFFICIENT TEXT ENTRY AND EDITING

CROSS REFERENCE TO RELATED APPLICATIONS

This application claims priority to U.S. Provisional Patent Application No. 62/046,883, filed Sep. 5, 2014, and entitled "DISPLAY-EFFICIENT TEXT ENTRY AND EDITING", the entirety of which is hereby incorporated herein by reference.

DETAILED DESCRIPTION

The present disclosure is directed to an intuitive and powerful mechanism for entering and/or editing textual input on a computing device. While the concepts of this disclosure are compatible with text-entry devices that have very small displays, the concepts are not limited to any particular device form factor.

Figure 1:
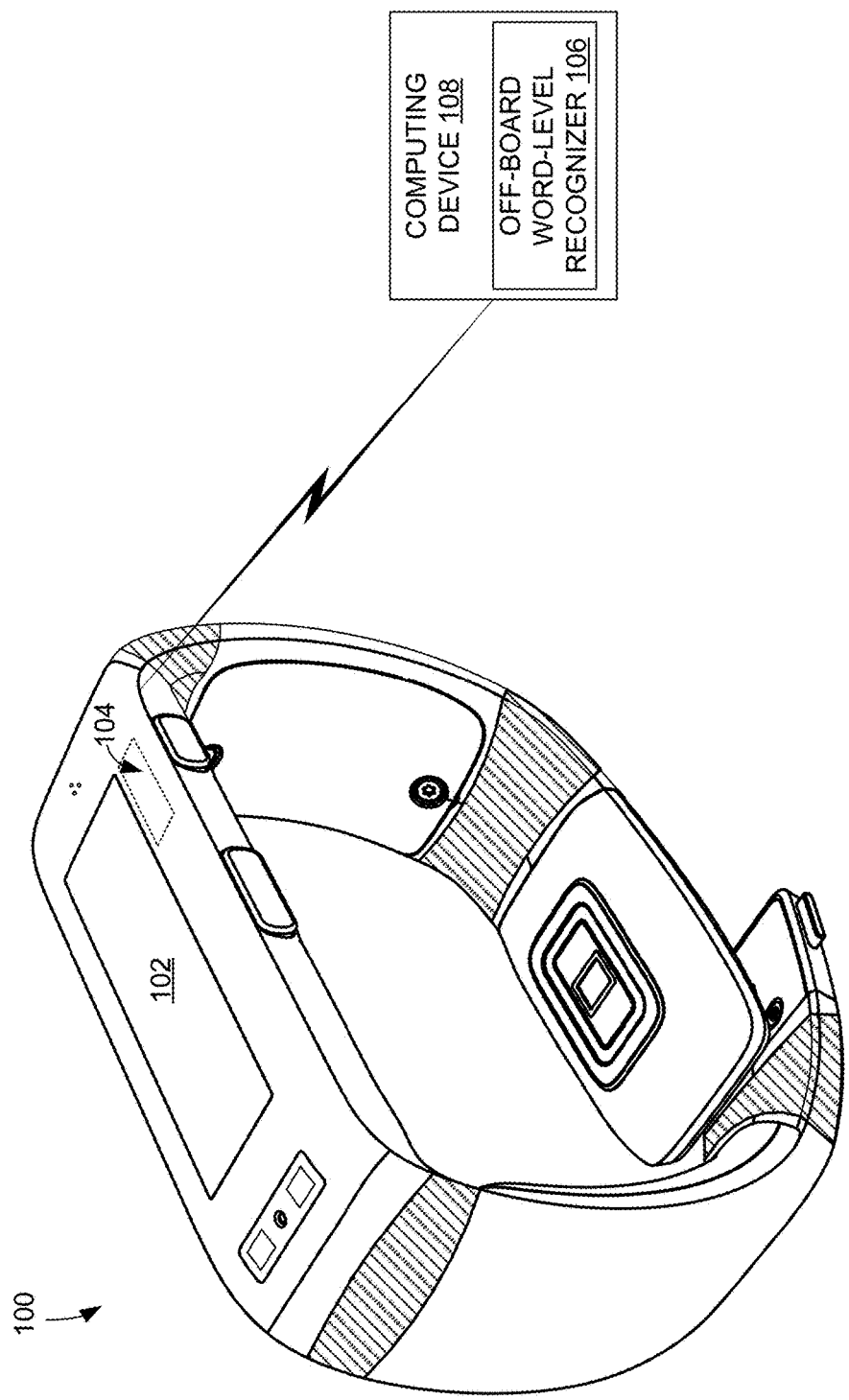
FIG. 1 schematically shows a text-entry device in the form of a wrist-wearable computing device.

FIG. 1 shows an example text-entry device in the form of a wrist-wearable computing device 100 including a touch display 102. Wrist-wearable computing device 100 is configured to receive user input and translate the input into text—e.g., letters, numbers, characters, and/or symbols.

As discussed in more detail below, text-entry devices may include touch display sensors that allow a user to input text via a virtual keyboard presented on a display; touch sensors that allow a user to draw text on a display or a non-display touch area; speech recognition systems that allow a user to enter text via spoken words; eye-tracking systems that allow a user to enter text via gaze; gesture recognition systems that allow a user to trace text shapes in air; and/or other text input mechanisms.

When included, a text-entry device's virtual keyboard may take full advantage of a small display size by filling substantially all of the display. In particular, the virtual keyboard may be presented without a significant portion of the display reserved for showing the user a letter-by-letter reproduction of what is being typed or what has already been typed. In some implementations, only the last completed word, or a portion thereof, is displayed with the keyboard—letters of an uncompleted word are not displayed until the word is completed, and the penultimate word is not displayed with the last completed word. In some implementations, a last completed word, or a portion thereof, is displayed immediately adjacent the right- or left-most key in a bottom row of the virtual keyboard. The last completed word, or a portion thereof, may additionally or alternatively be displayed (e.g., superimposed) over the keyboard temporarily (e.g., for a set period of time and/or until a suitable input is received). The superimposed word or portion thereof may be partially transparent and/or the appearance of the keyboard may be altered (e.g., dimmed) during display of the superimposed text in some examples. Optionally, a placeholder (e.g., asterisks or bullet) may be displayed in these same areas responsive to each recognized key stroke.

In some implementations, two or more different virtual keyboards may cooperate to provide a user a greater number of text input options. As an example, one keyboard may include 26 lower case letter keys; another keyboard may include 10 numeric keys; another keyboard may include one or more symbols (e.g., @, #, $, %, &, and/or others) and/or emoticons; another keyboard may include 26 upper case letter keys; and another keyboard may include one or more foreign language letters or symbols (e.g., Hanzi, Kanji, and/or others). In addition to the primary keys of a given keyboard, some keyboards may also include a space key, one or more modifier keys, one or more punctuation keys (e.g., period, comma, question mark), and/or other supplemental keys. When two or more keyboards are included, a user may selectively toggle between the keyboards with a touch swipe, voice command, gesture, gaze, and/or other user command. In some implementations, keys of one keyboard may provide direct links to different keyboards. FIGS. 2-9 show example virtual keyboards.

The computing device may leverage an on-board word-level recognizer 104 or off-board word-level recognizer 106 (e.g., within a remote computing device 108) that analyzes all input between text delimiters and recommends candidate text based on the word-level analysis. In some embodiments, (e.g., during utilization of keyboards relating to character-based languages), each input character may be processed and words may be determined based on natural word boundaries for that language without inputting specific delimiters. Once a text-delimiter, other user indication, or language-based natural word boundary signals a word completion, the word-level recognizer may determine the word or words that the user most-likely intended to input. Before the user indication signals a word completion, the word-level recognizer need not present any word predictions. By avoiding such predictions, the user will not be distracted by potentially unintended word fragments that are inaccurately predicted based on less than all user input for that word. The word-level recognizer may be trained via supervised or unsupervised machine learning and/or may include personalized training data from the computing device or a cloud-based network.

When an off-board word-level recognizer is utilized, the text-entry device may communicate all user input to the off-board word-level recognizer using one or more local or wide area networks. In some implementations, the off-board word-level recognizer may be a module of a mobile telephone or other portable computing device that is physically near the text-entry computing device. In other implementations, the off-board word-level recognizer may be offered as part of a remote cloud-based service. The local text-entry device and the off-board, word-level recognizer may communicate using any suitable protocol and/or technology.

Non-limiting examples of suitable protocols and technologies are described in APPENDIX A.

When an off-board, word-level recognizer is used in cooperation with a virtual keyboard, the text-entry device optionally may use very light weight communication with the off-board, word-level recognizer. As one example, the text-entry device may communicate the detected touch contact parameters to the off-board, word-level recognizer. This may be less computationally expensive than translating raw sensor measurements on board and then communicating translation of the raw input.

The text-entry device may provide text editing functionality that allows a user to verify and/or change candidate text that has been recognized using any of the device's text input mechanisms. The text editor is displayed independently and is not part of the virtual keyboard's graphical user interface. By temporally separating display of a virtual keyboard and the text editor, both the virtual keyboard and the text editor are allowed to independently take full advantage of whatever display real estate the text-entry device offers. The virtual keyboard does not have to make any compromises for the text editor or vice versa. In some implementations, a user may selectively toggle between a virtual keyboard and the text editor. Such toggling may be initiated by a touch swipe, voice command, gesture, gaze, greater-than-threshold pause, and/or other event or user command. A toggle between a virtual keyboard and a text editor may include an animation where the virtual keyboard appears to be pushed off the display by the text editor, or vice versa.

The text editor may display candidate text translated from user input (e.g., via a word-level recognizer). In some instances, the candidate text may not be the final text that the user wants. As such, the text editor is configured to allow the user to select any word for editing, delete any word, add new words, and/or make other changes. In some examples, the text editor may provide one or more alternate candidate words for each candidate word. FIGS. 9-15 show non-limiting examples of text editors and editing scenarios.

Figure 2:
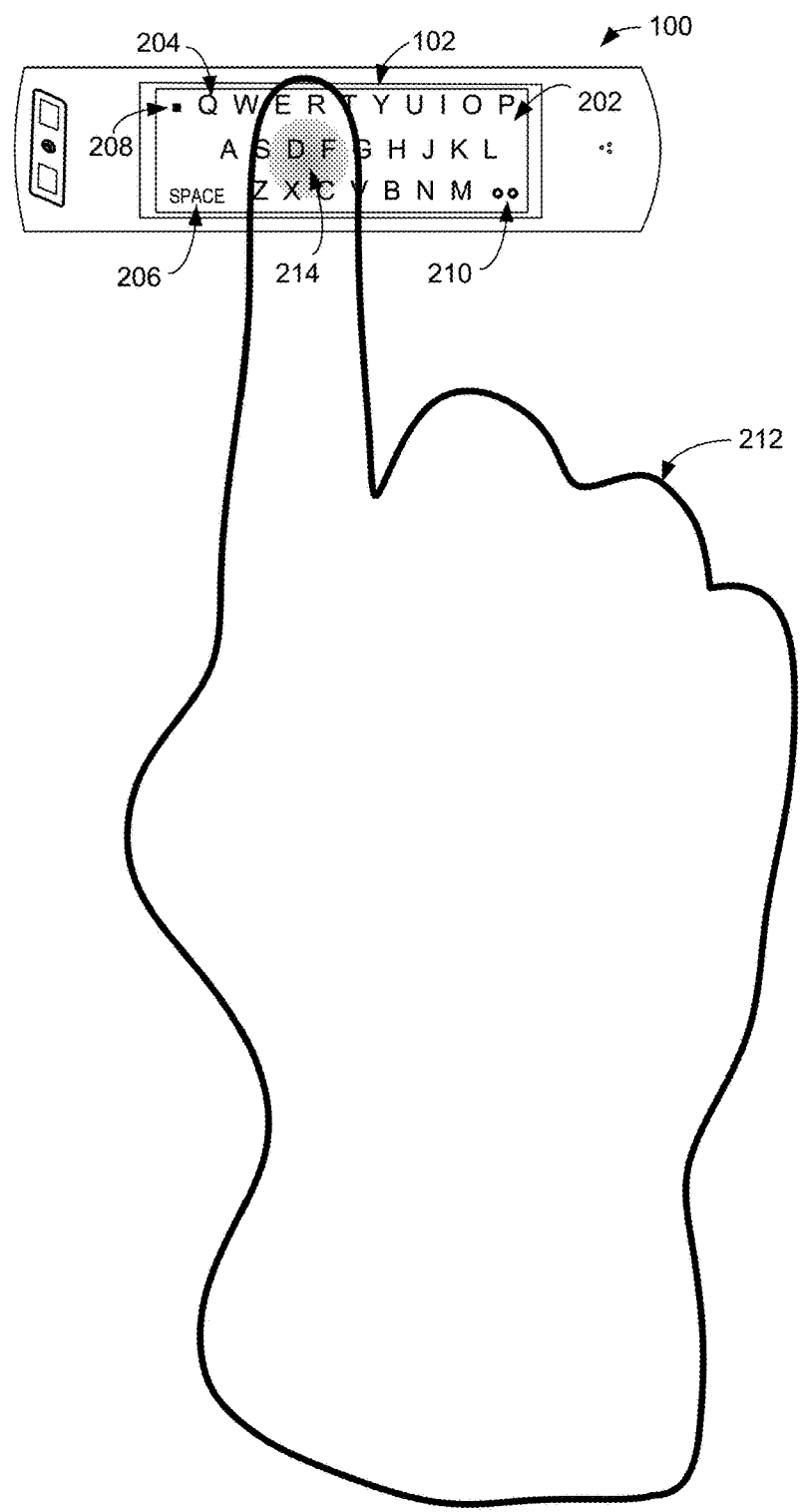
FIG. 2 shows an example user interface displayed on a touch display of a text-entry device.

Turning now to FIG. 2, an example user interface 202 displayed on the touch display 102 of the wrist-wearable computing device 100 of FIG. 1 is illustrated. The user interface 202 may include two or more pages, including a menu page, one or more virtual keyboard pages, and/or a text editor page. The menu may enable a user to select a desired keyboard layout from among a plurality of possible layouts and/or may include directional navigation keys (e.g., a back or exit button). A virtual keyboard may comprise letters, numbers, and/or symbols that a user may select using touch input. Text entered by the user may be displayed and/or edited via the text editor. Text entered and edited as described herein may be used in virtually any computing scenario, including text messaging, emailing, word processing, note taking, and/or other writing scenarios.

Due to the relatively small size of the touch display 102, in order to allow a user to effectively visualize and enter touch input to each key of the virtual keyboard, menu option, etc., the user interface 202 may be configured such that only a portion of the user interface is displayed at any given time (e.g., either keyboard page or text editor page). For example, the user interface may be configured as a ribbon, and only a section of the ribbon may be displayed at one time, with each section of the ribbon viewable as a user scrolls through the user interface. Additional information regarding the ribbon configuration of the user interface will be provided below with respect to FIGS. 10A-10C.

FIG. 2 illustrates a virtual keyboard 204 of the user interface 202 including letters arranged in a standard QWERTY keyboard arrangement, one or more text delimiters, including a space key 206 and a period key 208, and a text preview area 210. Due to the relatively small size of the display 102, the virtual keyboard 204 may occupy nearly all of the available display space, and thus the menu and text editor regions of the user interface are not visible in FIG. 2. For example, the display 102 may have a top edge and a bottom edge, and the virtual keyboard may be presented without a text-editing area between the virtual keyboard and the bottom edge. As illustrated, a top row of keys of the virtual keyboard (e.g., the row having letters "QWE . . . ") may be displayed in a top third of the display 102, a middle row of keys of the virtual keyboard (e.g., the row having letters "ASD . . . ") may be displayed in a middle third of the display 102, and a bottom row of keys of the virtual keyboard (e.g., the row having letters "ZXC . . . ") may be displayed in a bottom third of the display 102.

It is to be understood that the illustrated arrangement of the virtual keyboard 204 is one example of possible arrangements, and other configurations are possible. For example, rather than having the letters arranged in the QWERTY arrangement illustrated, the letters may be arranged alphabetically or in virtually any suitable arrangement. Further, additional or alternative text delimiters may be present on virtual keyboard 204, including but not limited to a question mark key, exclamation point key, etc. Further still, while only letters are illustrated in virtual keyboard 204, it is to be understood that other characters, such as numbers or symbols, may be additionally or alternatively displayed, as explained in more detail below.

In order to create a text string, a user may touch the virtual keyboard 204. As such, computing device 100 may include a plurality of touch sensors configured to detect touch input. In some examples, more than one letter, number, or symbol may be mapped to the same touch sensor (i.e., the touch sensing resolution may be less than the number of keys).

In the example illustrated in FIG. 2, a preview area 210 displays placeholder symbols that indicate the number of touch inputs that have currently been entered by the user. The placeholder symbols may comprise suitable symbols, such as asterisks, bullets, or other symbols. In this way, the user may see how many touch inputs (e.g., how many characters) he or she has entered without seeing the actual characters, until a text delimiter key is entered. Once the user makes an input to a text delimiter key (e.g., the space key 206 or the period key 208), a candidate word may be displayed in the preview area.

When the user is entering touch inputs to the user interface 202, in addition to displaying how many touch inputs have been made in the preview area 210, the user interface 202 may also be configured to provide touch input feedback to the user to inform the user where the last touch input occurred. For example, as illustrated in FIG. 2, a user 212 has entered touch input to virtual keyboard 204 at a location near the D, F, X, and C keys. A feedback indicator 214 may be displayed on the user interface 202 to provide a visual indicator to the user of the location of the most recent touch input. The feedback indicator may be a semi-transparent circle, as illustrated in FIG. 2, or may be of another suitable design. Further, the feedback indicator may persist on the display 102 for a duration after the user has ended the current touch input, for example until a subsequent touch input is entered and/or for a predetermined/selected duration. In some examples, the feedback provided to the user may include haptic feedback, audio feedback, or other suitable feedback.

A plurality of example scenarios for interacting with a user interface displayed on the touch display 102 of computing device 100 will now be described with respect to FIGS. 3-16. It is to be understood that one or more of the user interface examples and states described below may correspond to user interface 202.

Figure 3:
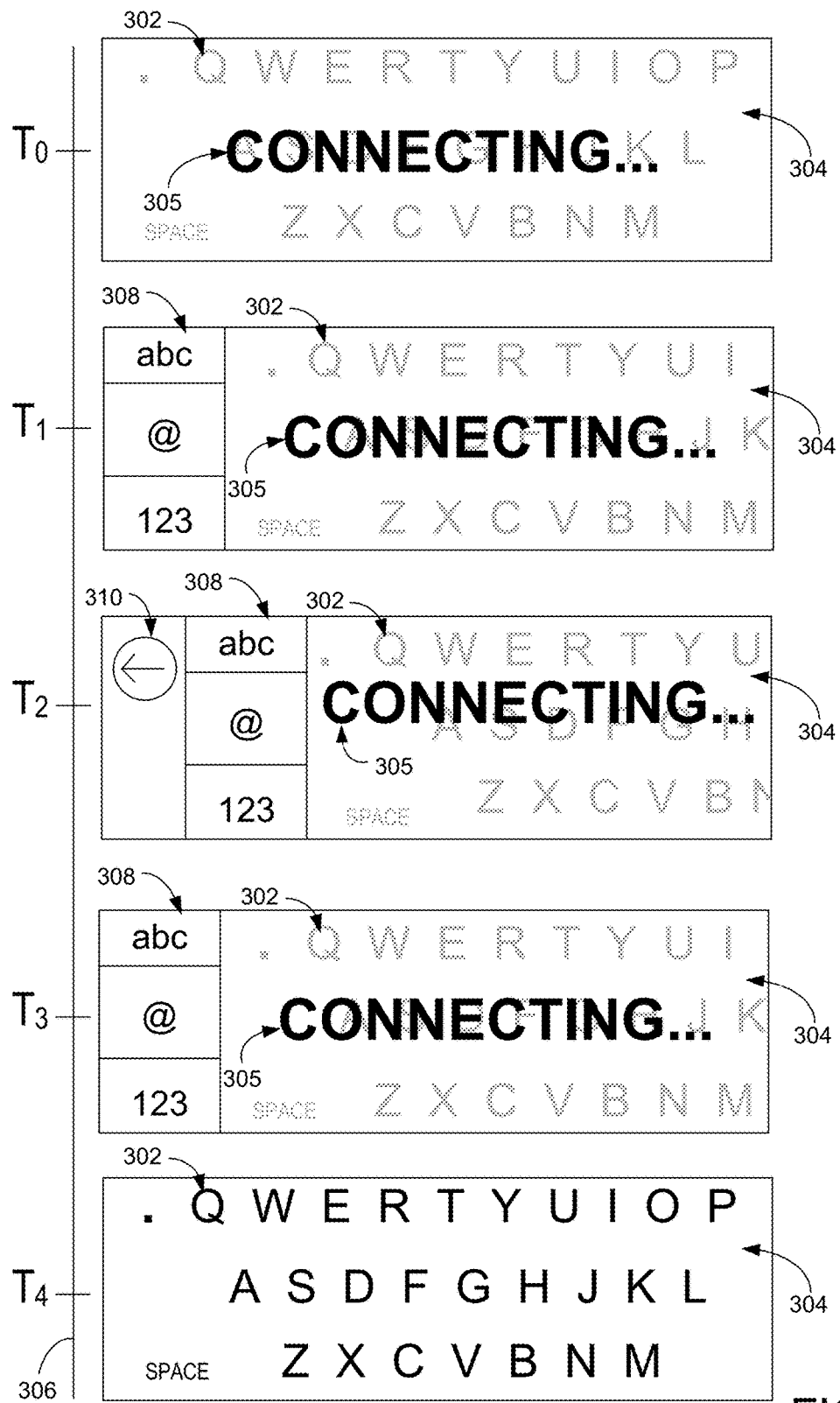
FIG. 3 shows an example initialization scenario of a text-entry device.

Starting with FIG. 3, an example initialization scenario illustrating an initialization of a virtual keyboard 302 of a user interface 304 is displayed. The initialization scenario includes a series of user interface states that may be displayed over time. As such, a timeline 306 is depicted in FIG. 3 along the vertical axis. At time $T_0$, the user interface 304 displays a connecting notification 305 that notifies the user that the virtual keyboard is being initialized, e.g., that the computing device 100 is connecting to a remote device to enable the identification of candidate words based on user touch inputs to the virtual keyboard, as explained above. During this time, the connecting notification is displayed over the virtual keyboard. In some implementations, a connection period may not be needed.

At time $T_1$, the user interface 304 transitions to display a preview of a menu 308. The menu 308 may allow a user to select a desired keyboard layout, such as a keyboard that displays letters, numbers, or symbols. The preview is displayed as a hint to inform a user that the menu is available to the left of the virtual keyboard 302. At time $T_2$, the user interface 304 further transitions to display a navigation key 310. The navigation key 310 may allow a user to exit out of the virtual keyboard 302, return to a previous user interface display, or execute other operations. At times $T_3$ and $T_4$, the user interface 304 slides back to only display virtual keyboard 302. It is to be understood that the type of keyboard displayed upon initialization of the virtual keyboard may be context-dependent. For example, the keyboard may be initialized responsive to a user input for responding to a received message (e.g., an email, an SMS message, or another suitable message). Accordingly, the keyboard presented responsive to such selection may have a language corresponding to a detected language of the received message. A default type of keyboard may additionally or alternatively be defined by user preference settings.

The initialization animation illustrated in FIG. 3 is a non-limiting example of an animation that may be used to inform a user that functions that typically may be displayed on a same page as a virtual keyboard can be accessed on a different page, thus allowing keys and/or other display real estate associated with such functions to be omitted from the virtual keyboard.

Figure 4:
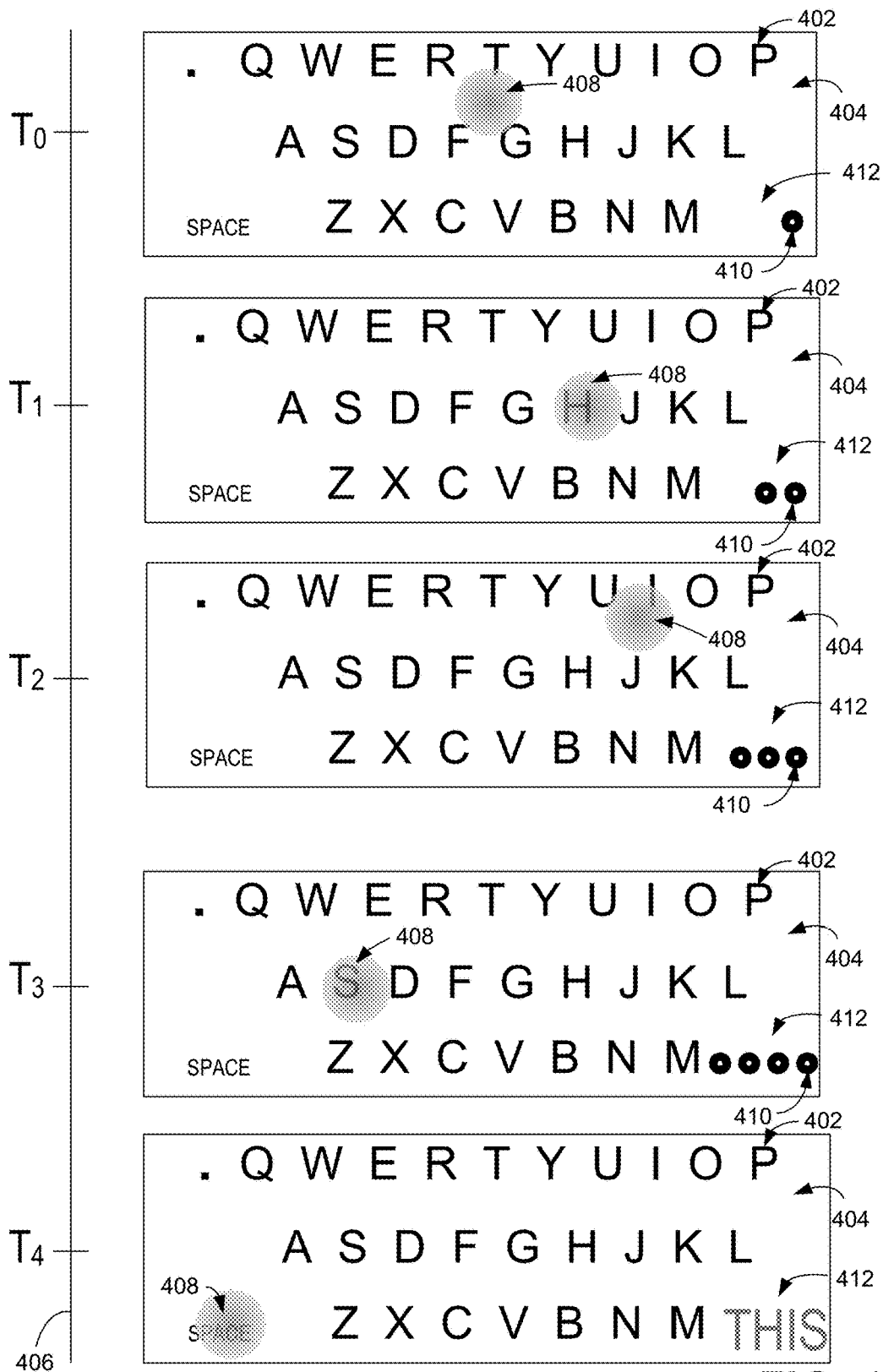
FIG. 4 shows a text entry scenario of a text-entry device.

FIG. 4 shows an example text input scenario for entering text input via virtual keyboard 402 of a user interface 404. Similar to FIG. 3, a timeline 406 is depicted along a vertical axis and a series of user interface states are illustrated over time. As explained above, a feedback indicator optionally may be displayed each time a user enters a touch input. Thus, at time $T_0$, in response to a touch input entered by a user, a feedback indicator 408 is displayed at the location of the touch input, which in this example is in the vicinity of the T, G, F, and R keys. Similarly, at time $T_1$, the feedback indicator 408 is displayed at a different location, corresponding to a second touch input entered by the user over the H key. At time $T_2$, the feedback indicator 408 is displayed at another location, in response to a subsequent user touch input at the region of the I and U keys. At time $T_3$, the feedback indicator is displayed at a further different location corresponding to the location of another touch input over the S key, and at time $T_4$, the feedback indicator 408 is displayed at another location in response to an additional touch input at the space key.

When the user enters touch input to the virtual keyboard 402, a placeholder symbol 410 is displayed in a preview area 412. For each separate touch input entered between text delimiters, a placeholder symbol is displayed. Accordingly, a first placeholder symbol (in this example, a bullet) is displayed in preview area 412 at time $T_0$, indicating that one touch input has been entered. At time $T_1$, two placeholder symbols are displayed in preview area 412, indicating that two touch inputs have been entered. At time $T_2$, three placeholder symbols are displayed in preview area 412, indicating three touch inputs have been entered. At time $T_3$, four placeholder symbols are displayed in the preview area 412, indicating that four touch inputs have been entered.

At time $T_4$, the user enters touch input to the space key, which as explained above is a text delimiter. As such, the raw sensor data corresponding to the four touch inputs are processed to determine one or more candidate words. Once at least one candidate word is determined, a candidate word is displayed in the preview area 412. In one example, the displayed candidate word may be the word that the word-level recognizer has determined is the most likely word represented by the touch inputs received. In the example touch input scenario illustrated in FIG. 4, the user has entered touch input that the word-level recognizer determines to correspond to the word "THIS."

While providing input to the computing device 100, the user may access different keyboard layouts in order to expand the number and types of characters that may be entered. FIGS. 5A, 5B, 6, and 7 show example keyboard layout selection scenarios. In the examples illustrated in FIGS. 5A and 5B, keyboard layouts may be accessed by performing a swiping or slide gesture input (e.g., moving a finger or other input device across the display) while viewing a virtual keyboard.

Figure 5A:
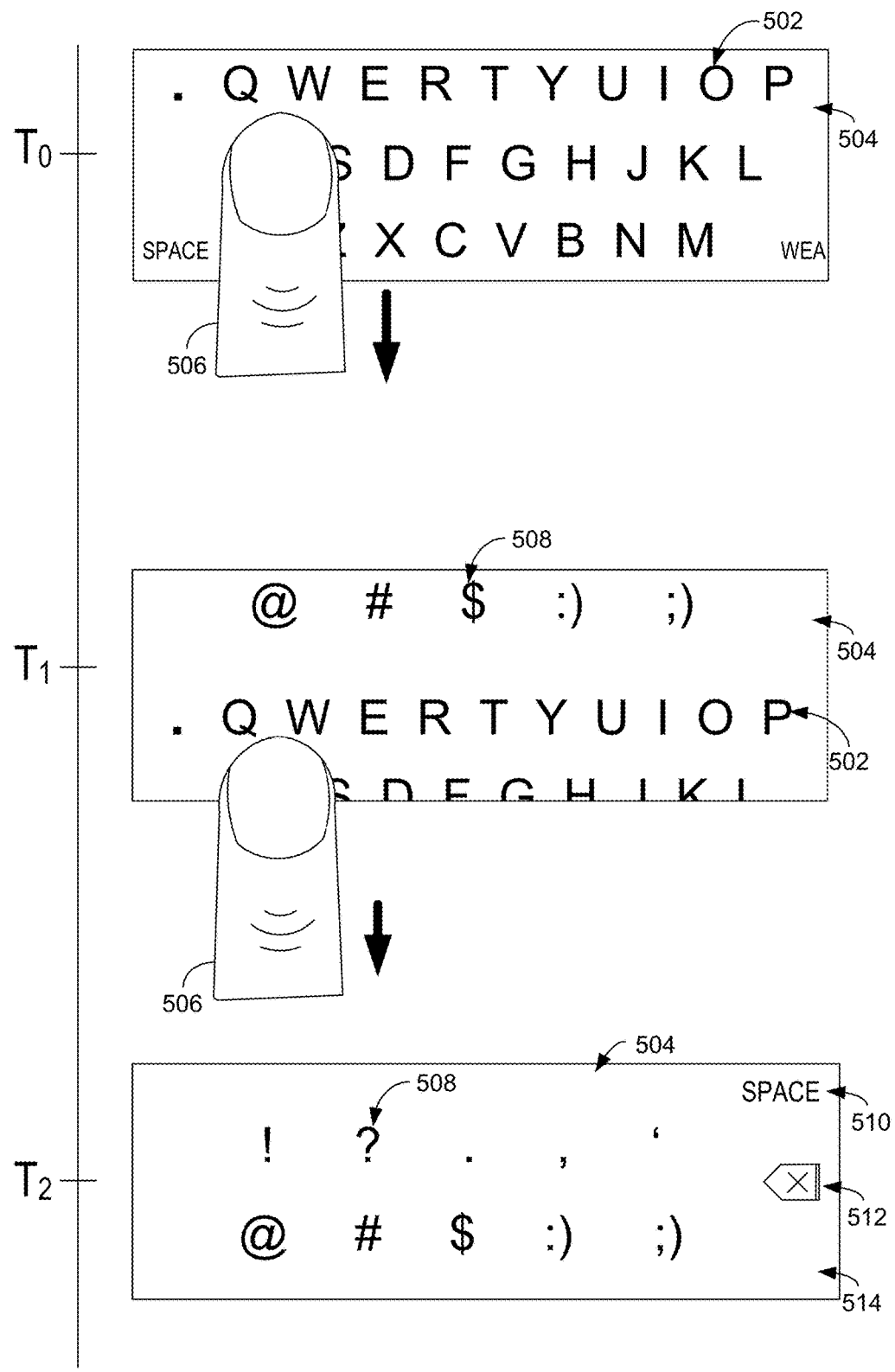
FIGS. 5A, 5B, 6, and 7 show keyboard layout selection scenarios of a text-entry device.

At time $T_0$ in FIG. 5A, a QWERTY virtual keyboard 502 is displayed, and a user begins a downward vertical swipe gesture (e.g., via finger 506) to access a different keyboard layout. At time $T_1$, the downward swipe is continued, and a portion of a symbol keyboard layout 508 is presented along a top of the viewable user interface 504 as the symbol keyboard is moved into view. A portion of the QWERTY virtual keyboard 502 is no longer displayed, as the QWERTY keyboard is moved out of view for replacement by the symbol keyboard 508. At time $T_2$, the downward swipe is completed, and the symbol keyboard is displayed, replacing the QWERTY keyboard. As illustrated, the symbol keyboard includes a plurality of symbols (e.g., punctuation, symbolic characters, and emoticons), a space delimiter 510, a delete icon 512, and a preview area 514 (e.g., for displaying entered symbols). It is to be understood that any suitable symbols may be included in the symbol keyboard.

Figure 5B:
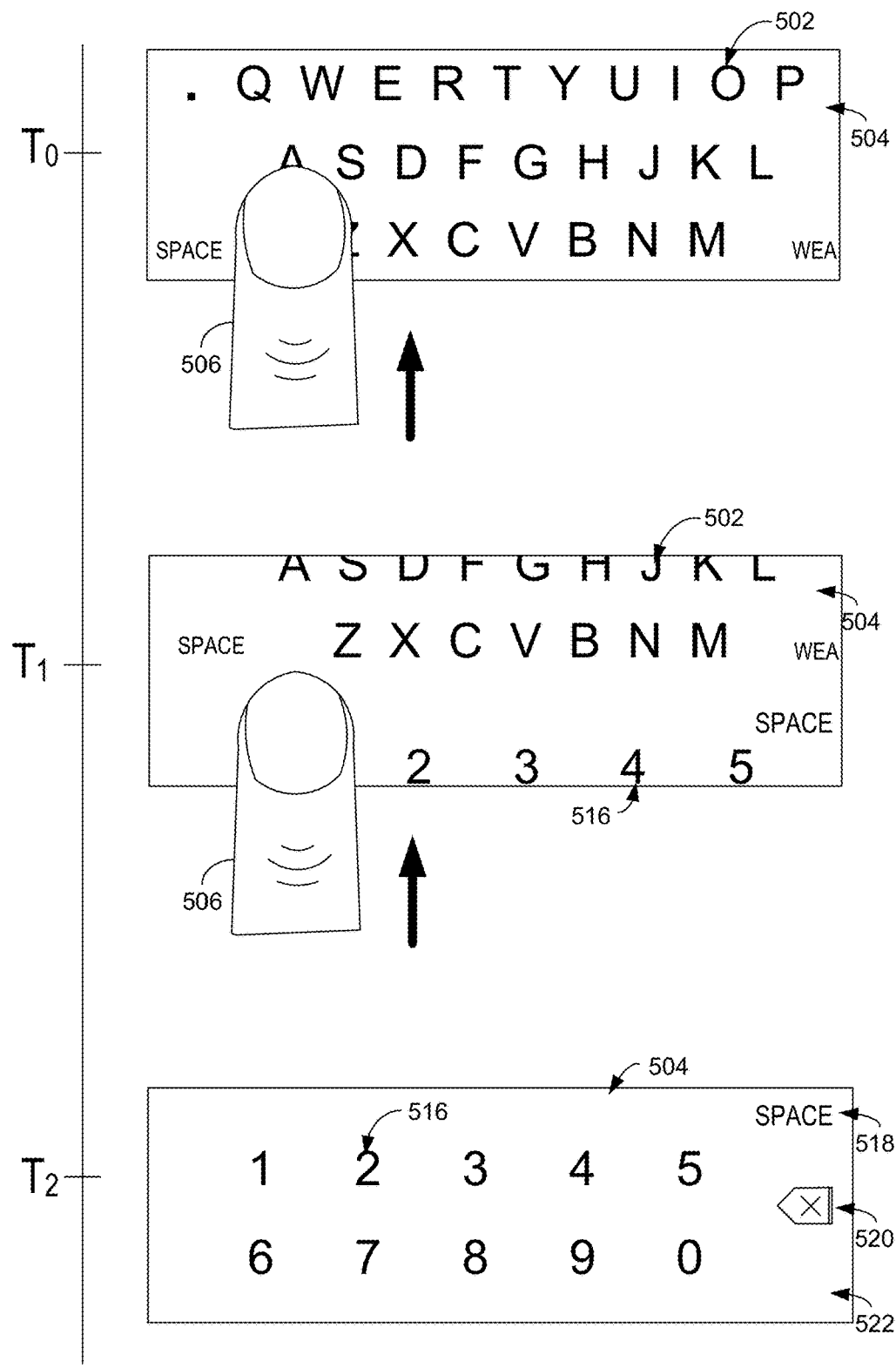

Turning now to FIG. 5B, a numerical keyboard layout accessible by an upward vertical swipe is illustrated. At time $T_0$ in FIG. 5B, a user begins an upward vertical swipe gesture (e.g., via finger 506) to access a different keyboard layout. At time $T_1$, the upward swipe is continued, and a portion of a numerical keyboard layout 516 is presented along a bottom of the viewable user interface 504 as the numerical keyboard is moved into view. A portion of the QWERTY virtual keyboard 502 is no longer displayed, as the QWERTY keyboard is moved out of view for replacement by the numerical keyboard 516. At time $T_2$, the upward swipe is completed, and the numerical keyboard is displayed, replacing the QWERTY keyboard. As illustrated, the numerical keyboard includes numerals 0-9, a space delimiter 518, a delete icon 520, and a preview area 522 (e.g., for displaying entered numbers). It is to be understood that any suitable numbers may be included in the numerical keyboard layout for selection. In some implementations, additional or alternative keyboard layouts may be accessed by performing additional or alternative swiping gestures or other user input while a virtual keyboard is displayed.

Figure 6:
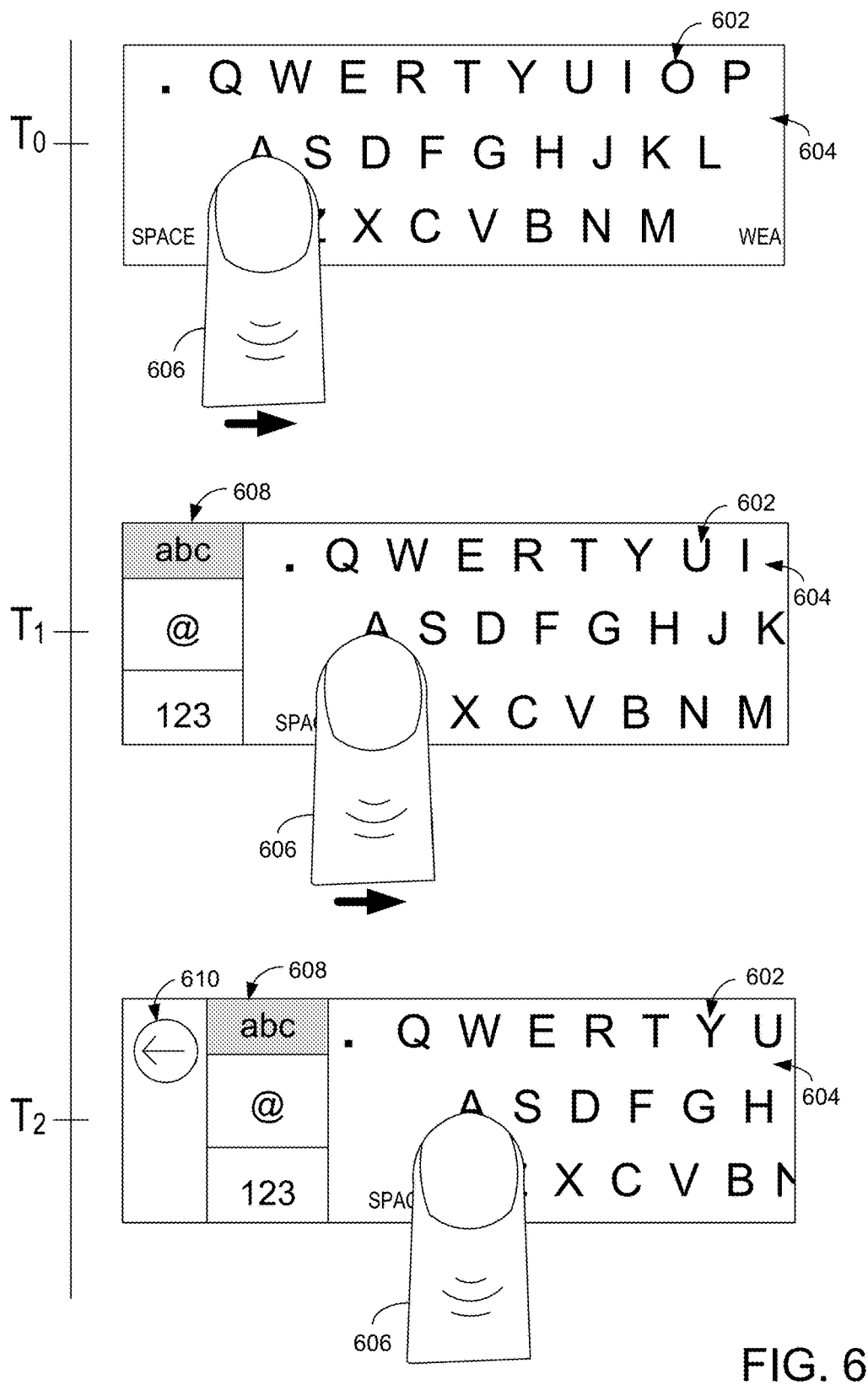

As described above, FIGS. 5A and 5B illustrate examples of accessing additional keyboard layouts via swiping gestures. In other implementations, additional keyboard layouts may be accessed via selection of direct links and/or keys (e.g., a menu item), as illustrated in FIG. 6. At time $T_0$ in FIG. 6, a QWERTY virtual keyboard 602 is included in a user interface 604. Also at time $T_0$, a user begins a horizontal swipe gesture toward the right of the display (e.g., via finger 606) to access a different keyboard layout. At time $T_1$, the QWERTY virtual keyboard is dragged to the right, such that a portion of the keyboard is no longer displayed (e.g., letters on the right side of the keyboard). A portion of a keyboard selection menu 608 is displayed to the left of the QWERTY virtual keyboard 602. At time $T_2$, the horizontal swipe gesture is completed, and a navigation key 610 is displayed to the left of the keyboard selection menu 608. As described above, the navigation key 610 may include a back button or similar key that enables a user to cancel a current task, exit the keyboard, exit the keyboard selection menu (e.g., return to a display of a virtual keyboard), and/or input any other suitable command. It is to be understood that the placement of the keyboard selection menu illustrated in FIG. 6 is exemplary in nature, and the keyboard selection keys may be displayed with any suitable arrangement or omitted altogether.

Figure 7:
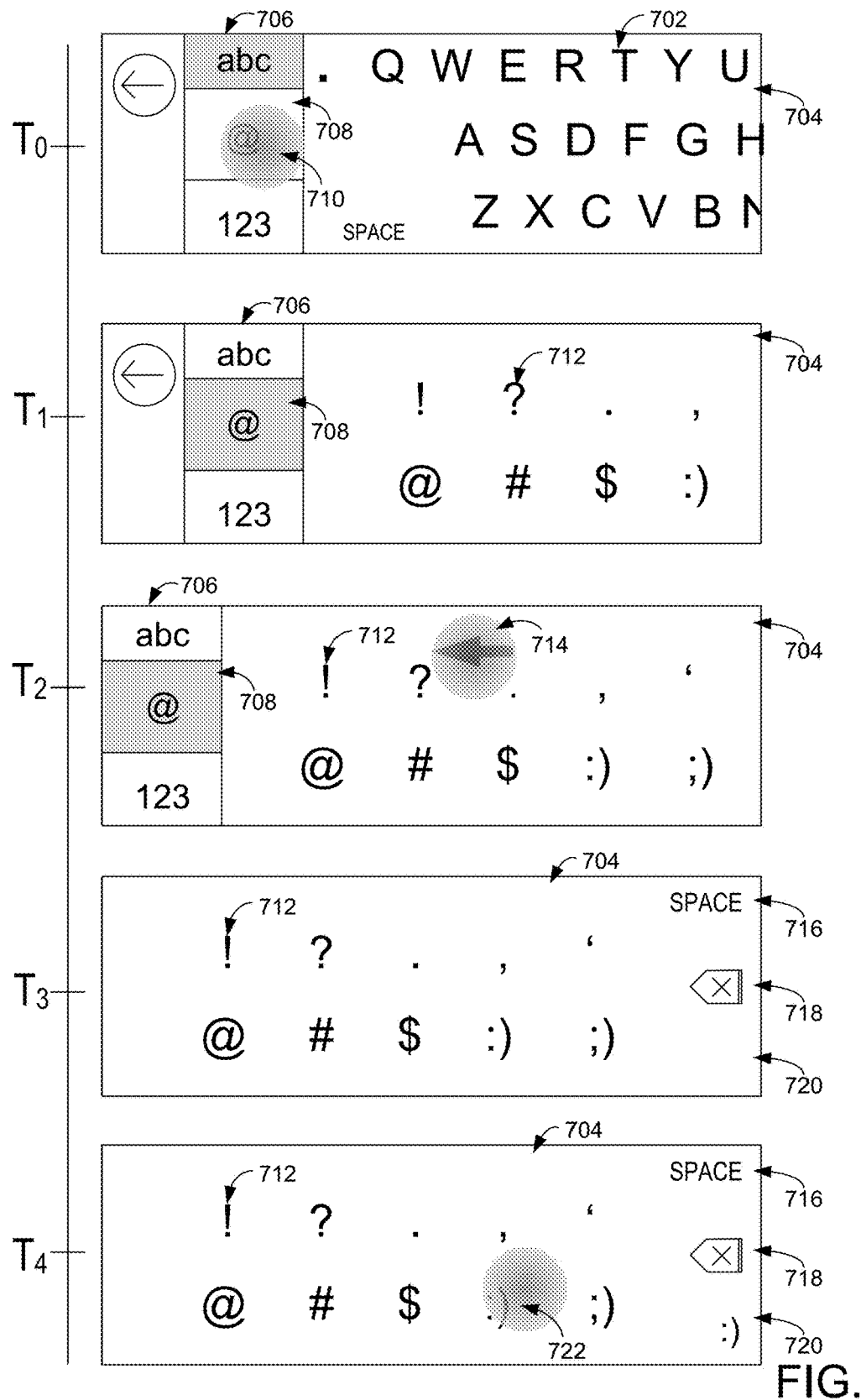

FIG. 7 illustrates an example scenario for selecting a symbol keyboard layout via the keyboard selection menu. At time $T_0$, a portion of a QWERTY virtual keyboard 702 of a user interface 704 is displayed to the right of a keyboard selection menu 706. Also at time $T_0$, user input is received at a symbol keyboard layout selection key 708 (e.g., as represented by feedback indicator 710). In response to the user input, a symbol virtual keyboard 712 is selected at time $T_1$, as indicated by a highlighting or other visual distinction of the symbol keyboard layout selection key 708. As also illustrated at time $T_1$, a portion of the symbol virtual keyboard is displayed to the right of the keyboard layout selection menu 706, including a subset of the symbols included in the symbol virtual keyboard. The portion of the symbol virtual keyboard displayed at time $T_1$ replaces the portion of the QWERTY virtual keyboard 702 displayed at time $T_0$.

At time $T_2$, a horizontal swiping gesture is being performed, as represented by leftward-moving gesture indicator 714. As a result of the swiping gesture, the user interface 704 is dragged to the left to transition from the keyboard layout selection menu to the selected virtual keyboard (e.g., the symbol virtual keyboard). As illustrated, the navigational key is no longer displayed, the keyboard selection keys of the keyboard layout menu 706 are displayed on a far left side of the display, and additional symbols (e.g., relative to the symbols displayed at time $T_1$) are displayed in the virtual keyboard area. At time $T_3$, the swiping gesture is concluded, revealing the full symbol keyboard. It is to be understood that the illustrated symbols included in the symbol virtual keyboard are exemplary in nature, and any suitable symbols may be included in any suitable arrangement. In addition to the symbols of the symbol virtual keyboard, a delimiter key (e.g., space key 716), a delete key 718, and a preview area 720 are displayed. As illustrated at time $T_4$, selection of a symbol in the symbol virtual keyboard (e.g., as indicated by feedback indicator 722) results in the display of the selected symbol within preview area 720. In other words, a symbol may include an implied delimiter. In some implementations, a placeholder may be displayed until a dedicated delimiter key is selected.

Figure 8:
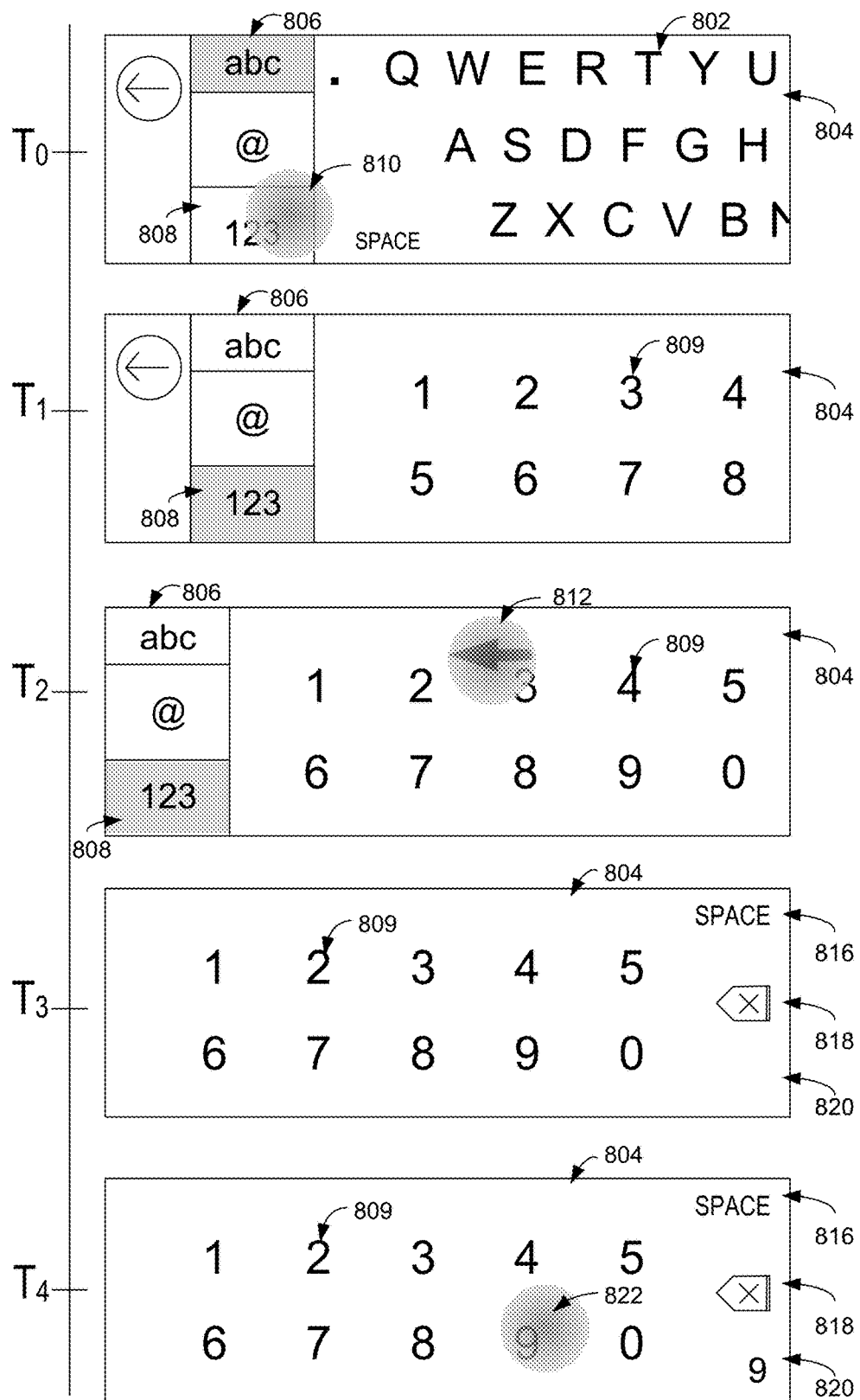
FIG. 8 shows a scenario for selecting a numerical keyboard layout on a text-entry device.

FIG. 8 illustrates an example scenario for selecting a numerical keyboard layout via the keyboard selection menu described above. At time $T_0$, a portion of a QWERTY virtual keyboard 802 of a user interface 804 is displayed to the right of a keyboard selection menu 806. Also at time $T_0$, user input is received at a numerical keyboard layout selection key 808 (e.g., as represented by feedback indicator 810). In response to the user input, a numerical virtual keyboard is selected at time $T_1$, as indicated by a highlighting or other visual distinction of the symbol keyboard layout selection key 808. As also illustrated at time $T_1$, a portion of a numerical virtual keyboard 809 is displayed to the right of the keyboard layout selection menu 806, including a subset of the numbers included in the numerical virtual keyboard. The portion of the numerical virtual keyboard 809 displayed at time $T_1$ replaces the portion of the QWERTY virtual keyboard 802 displayed at time $T_0$.

At time $T_2$, a horizontal swiping gesture is being performed, as represented by leftward-moving gesture indicator 812. As a result of the swiping gesture, the user interface 804 is dragged to the left to transition from the keyboard layout selection menu to the selected virtual keyboard (e.g., the numerical virtual keyboard 809). As illustrated, a navigational key is no longer displayed, the keyboard selection keys are displayed on a far left side of the display, and additional numbers (e.g., relative to the numbers displayed at time $T_1$) are displayed in the virtual keyboard area. At time $T_3$, the swiping gesture is concluded, revealing the full numerical virtual keyboard 809. It is to be understood that the illustrated numbers included in the numerical virtual keyboard are exemplary in nature, and any suitable numerical values or other related characters (e.g., mathematical symbols, decimal points, and/or other suitable characters) may be included in any suitable arrangement. In addition to the numbers of the numerical virtual keyboard, a delimiter key (e.g., space key 816), a delete key 818, and a preview area 820 are displayed. As illustrated at time $T_4$, selection of a number (e.g., "9") in the numerical virtual keyboard (e.g., as indicated by feedback indicator 822) results in the display of the selected number within preview area 820. In other words, a number may include an implied delimiter. In some implementations, a placeholder may be displayed until a dedicated delimiter key is selected.

Figure 9:
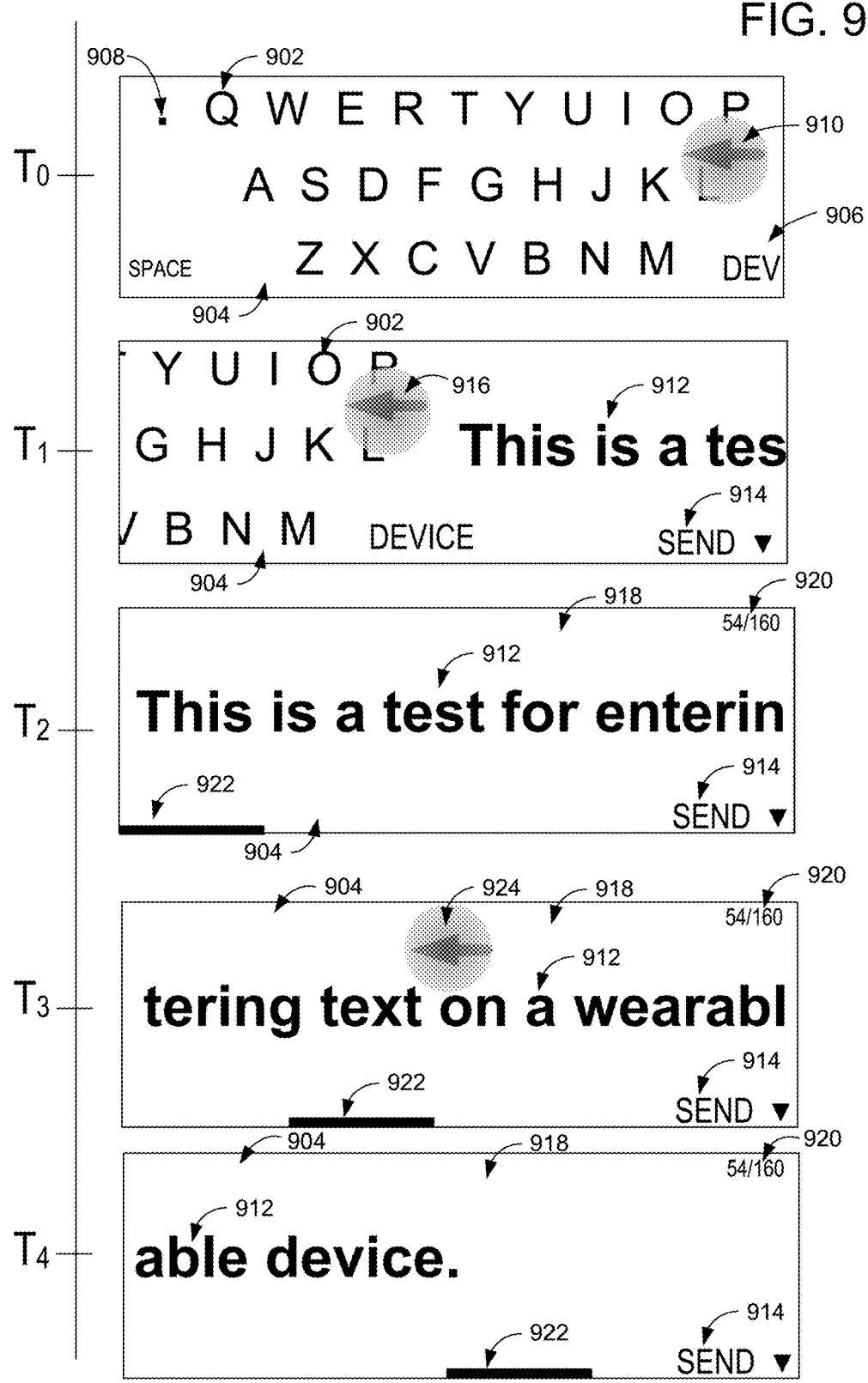
FIG. 9 shows a text editor viewing scenario on a text-entry device.

As described above, example virtual keyboards may be configured to occupy substantially all of a display, leaving little room for viewing entered text/characters. In order to view input that has already been entered (e.g., candidate text that has been recognized, forming at least a portion of a message), a text editor may be accessed by providing user input to the device (e.g., a touch input such as a tap, swipe, slide, or other gesture, a physical button actuation, a detected eye gaze, a voice input, or any other suitable input). FIG. 9 illustrates an example of a transition from a virtual keyboard page to a text editor page.

At time $T_0$ in FIG. 9, a QWERTY virtual keyboard 902 of a user interface 904 is illustrated (e.g., without a text-editing area between the virtual keyboard and a top or bottom edge of a display). As shown in the lower right corner, a preview area 906 may include a portion of the last-recognized candidate text word. For example, prior to time $T_0$, a user may have provided input selecting a plurality of letters and then selected a delimiter (e.g., the period key 908), resulting in a candidate text "DEVICE" to be recognized based on the input strokes. As the preview area 906 is constrained to a particular region (e.g., the illustrated example shows a region that is large enough to show three characters from the example candidate text), the candidate text may be truncated if the text is larger than the size of the preview area. In this way, only a portion of the candidate text is displayed (e.g., the first three characters) in the preview area at time $T_0$.

The preview area is configured to truncate an end portion of the candidate text (e.g., in the event that the candidate text is too large to fit in the preview area) in order to suggest and/or provide a hint to a user as to the location of the remainder of the candidate text. For example, by noting that the candidate text is truncated by a right edge of the display, the user may be encouraged to drag the user interface (e.g., the virtual keyboard) to the left in order to reveal the remaining characters of the candidate text. Accordingly, as illustrated at time $T_0$, a show-text-editor input, such as a leftward horizontal swiping or sliding gesture may be initiated, indicated by leftward-moving gesture indicator 910. In response to the swiping gesture, the user interface 904 may be dragged to the left, as illustrated at time $T_1$. For example, only a right portion of the virtual keyboard may be displayed in a left region of the display, as the user interface transitions from a virtual keyboard to a text editor. The text editor may be partially displayed on a right side of the display, as illustrated by a partial string of candidate text 912 (e.g., a message string for a currently-composed message) and an action button (e.g., "SEND" key 914). It is to be understood that other suitable action buttons may be displayed. In some implementations, the "SEND" key 914 may include text and/or a graphical icon. As also illustrated at time $T_1$, the candidate text of a last-recognized word (e.g., "DEVICE") may be fully displayed, creating a "bleed-over" effect between the virtual keyboard and the text editor.

The swiping gesture is continued at time $T_1$, as illustrated by the leftward-moving gesture indicator 916. In response, at time $T_2$, the user interface is fully transitioned to the text editor 918 such that the text editor is displayed without the virtual keyboard. The text editor may display a string of candidate text 912 (e.g., recognized inputs during a current text input session and/or prior to selecting an action button such as a send key). The string of candidate text 912 may include words recognized from input to a QWERTY virtual keyboard, symbols selected from a symbol virtual keyboard, and/or numbers selected from a numerical virtual keyboard. In some implementations, the text editor may include a character counter 920. For example, some messages (e.g., SMS text messages), may be limited to include a threshold number of characters (e.g., due to bandwidth parameters and/or communication protocols). Character counter 920 may enable a user to keep track of how many characters have been entered during a text input session (e.g., how many characters are included in a message that is currently being composed).

The text editor 918 may also include a slider bar 922, which illustrates the length of the string of candidate text (e.g., a length of the slider bar may be relative to a length of the string of candidate text) and a currently-viewed location in the string of candidate text. For example, at time $T_2$, the beginning of the string may be in view, resulting in the display of the slider bar 922 in a lower far left corner of the display. As the user navigates along the string at time $T_3$ (e.g., as illustrated by leftward horizontal swiping gesture represented by leftward-moving gesture indicator 924), the string is moved along the display such that a different portion of the string is viewable. Accordingly, at time $T_3$, some of the text that was viewable at time $T_2$ is no longer viewable (e.g., is dragged out of the displayable region toward the left side of the display) and additional text that was not viewable at time $T_2$ is brought into view (e.g., is dragged from the right side of the display into the displayable region). As also illustrated at time $T_3$, the slider bar 922 is moved to the right, indicating that a middle portion of the string of candidate text is being viewed.

As the user continues navigating along the string at time $T_3$ (e.g., as illustrated by leftward horizontal swiping gesture represented by leftward-moving gesture indicator 924), the string is moved along the display such that a different portion (e.g., an end) of the string is viewable. Accordingly, at time $T_4$, some of the text that was viewable at time $T_3$ is no longer viewable (e.g., is dragged out of the displayable region toward the left side of the display) and additional text that was not viewable at time $T_3$ is brought into view (e.g., is dragged from the right side of the display into the displayable region). As also illustrated at time $T_4$, the slider bar 922 is moved to the right, indicating that an end portion of the string of candidate text is being viewed.

As illustrated in FIG. 9, the action button (e.g., "SEND" key 914) is presented responsive to displaying a portion of the text editor (e.g., at time $T_1$). In some implementations, selection of the "SEND" key may result in a sending and/or saving of the message. For example, if the text entry user interface is entered responsive to selecting a compose message or reply to message command, selecting the "SEND" key may result in sending the message to a selected recipient(s). In other implementations, selection of the "SEND" key at times $T_1$, $T_2$, $T_3$, and/or any other time in which the end of the candidate text string is not being viewed may result in the user interface automatically (e.g., without further user input) navigating to the end of the string (e.g., simulating an effect of a horizontal swiping gesture). A subsequent selection of the "SEND" key may result in sending and/or saving the message. In still other implementations, the action button may not be displayed until an end of the candidate text string is displayed and selecting the action button may result in the message being sent and/or saved.

Figure 10A:
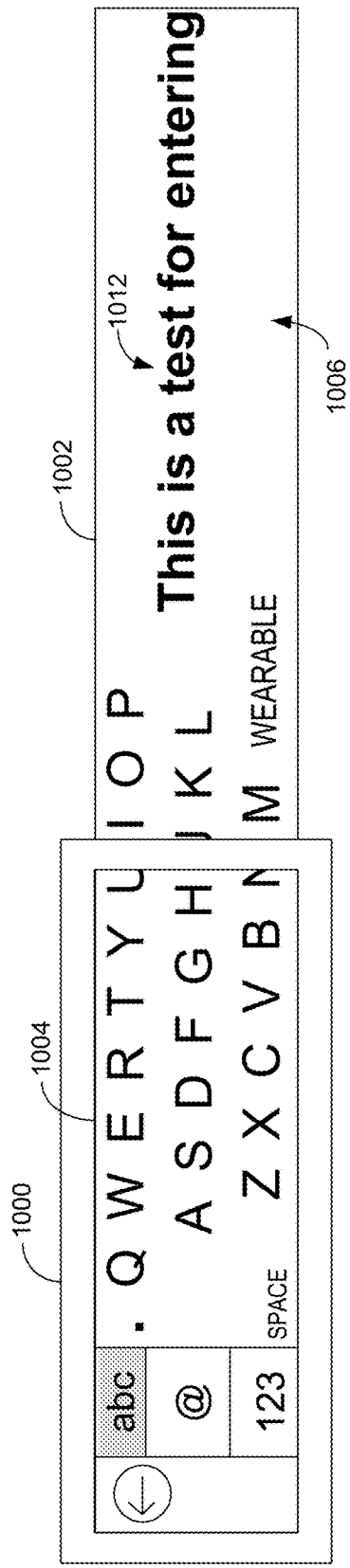
FIGS. 10A-10C show an example sliding ribbon configuration of a text-entry device.
Figure 10B:
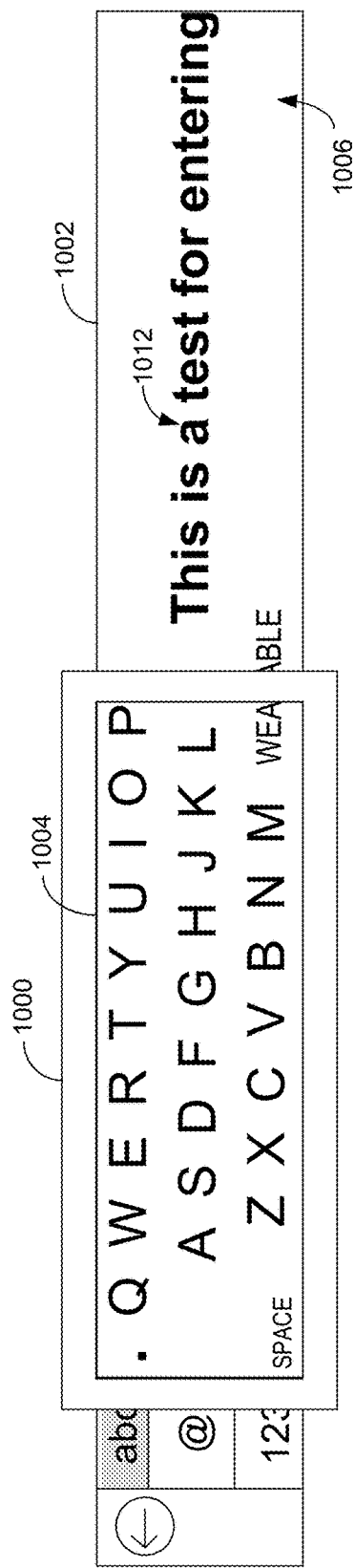
Figure 10C:
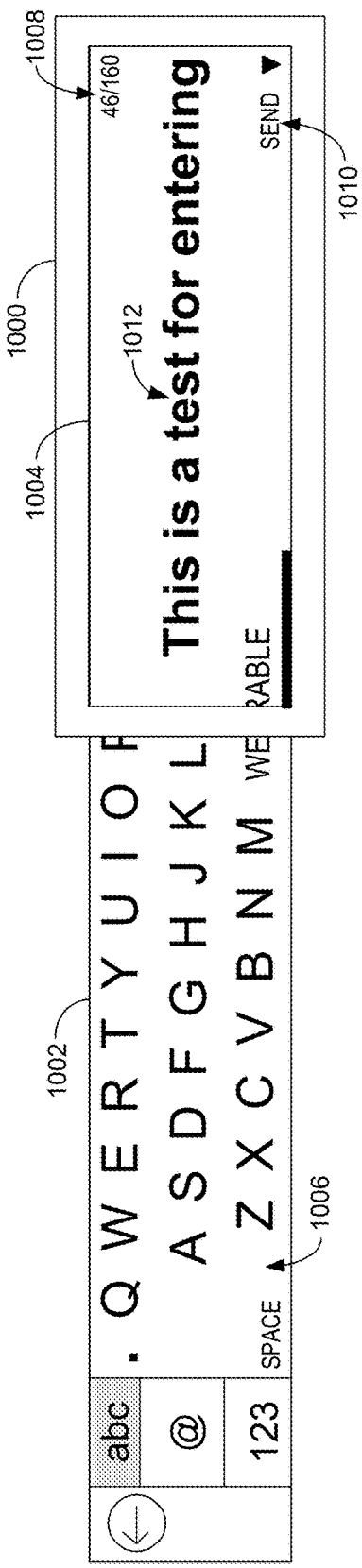

FIGS. 10A-10C illustrate a text-entry device 1000 (e.g., a wrist-wearable computing device) presenting a panoramic or ribbon graphical user interface 1002. For example, ribbon graphical user interface 1002 may correspond to the user interfaces described and illustrated in FIGS. 2-15. It should be understood that while FIGS. 10A-10C show portions of ribbon graphical user interface 1002 extending past the boundaries of the display of the text-entry device, such portions of the ribbon graphical user interface are not visible to a user. FIGS. 10A-10C are intended to show the horizontal portions of the ribbon graphical user interface which are not currently visible to a user, but which may be brought into view.

Text-entry device 1000 includes a display 1004 for presenting ribbon graphical user interface 1002, other user interfaces, applications, data, media content, and/or other content. Display 1004 has a first dimension along a first axis and a second dimension along a second axis. In the illustrated implementations, the first dimension is a height dimension and the second dimension is a width dimension. In other implementations, a display may be shaped differently. For example, while display 1004 is formatted with a landscape aspect ratio (i.e., width greater than height), a display with a portrait aspect ratio (i.e., height greater than width), a square aspect ratio, or a non-rectangular aspect ratio may be used. Further, while ribbon graphical user interface 1002 is shown as being horizontally-pannable, a vertically-scrollable graphical user interface and/or a graphical interface that is both vertically-scrollable and horizontally-pannable is within the scope of this disclosure. In some implementations, the orientation of a display may automatically rotate responsive to the text-entry device being rotated.

Ribbon graphical user interface 1002 includes a collection of user interface states or input regions anchored over a contiguous background 1006. The user interface input regions may include a keyboard selection menu, a virtual keyboard, a text editor, and/or any other suitable user interface input region. As used herein, the term anchored means that the user interface input regions move with the contiguous background. In other words, the input regions do not scroll over the background while the background remains stationary. Instead, the input regions and the background move together. It should be understood, however, that some input regions may move relative to the contiguous background (e.g., growing, shrinking, rotating, changing form, and/or exhibiting other suitable relative movements). Furthermore, in some implementations, the background can optionally be scrolled at a different speed than the foreground to give the visual perception of parallax, which may help enforce a three-dimensional metaphor of the user interface.

As shown in FIGS. 10A-10C, ribbon graphical user interface 1002 is a fixed-height, horizontally-pannable graphical user interface. A height of ribbon graphical user interface 1002 is sized to fit within a first dimension of display 1004. In contrast, the width of the ribbon graphical user interface is too large to be completely visible at one time using display 1004. In particular, the contiguous background is sized to extend beyond the second dimension of the display, and at least one of the user interface input regions are arranged to extend beyond the second dimension of the display.

FIG. 10A shows a first state of the ribbon graphical user interface, in which a first user interface input region is viewable within display 1004 of the text-entry device 1000. As illustrated, a keyboard selection menu and a portion of a virtual keyboard may be viewable in the state illustrated in FIG. 10A. In FIG. 10B, the ribbon graphical user interface 1002 is presented within display 1004 in a second state, in which a second user interface input region (e.g., a virtual keyboard) is viewable. Likewise, in FIG. 10C, the ribbon graphical user interface 1002 is presented within display 1004 in a third state, in which a third user interface input region (e.g., a text editor) is viewable. In some embodiments, a user may fluidly transition between the illustrated user interface input regions, such that portions of multiple input regions are visible on the display during transitions (e.g., as the user progresses from one input region to another). In some embodiments, the user interface may "snap" or otherwise be biased toward presenting the illustrated user interface input regions discretely, such that simultaneous views of multiple input regions are only presented for a short period of time (e.g., in motion) while the user interface moves between input regions.

As further illustrated in FIG. 10C, some additional user interface elements (e.g., message counter 1008 and action button 1010) may only be displayed upon presentation of a particular input region. For example, the user interface elements may not appear when that input region is partially presented or in transition. The user interface elements may not be anchored to a contiguous background of the user interface, such that the elements remain in a particular location(s) of the display while the user interface is presenting an associated input region. For example, the message counter 1008 and action button 1010 may remain in the upper and lower right corners of the display 1004, respectively, as long as the text editor is viewable, even as the user interface is moved to show different portions of text string 1012.

Figure 11:
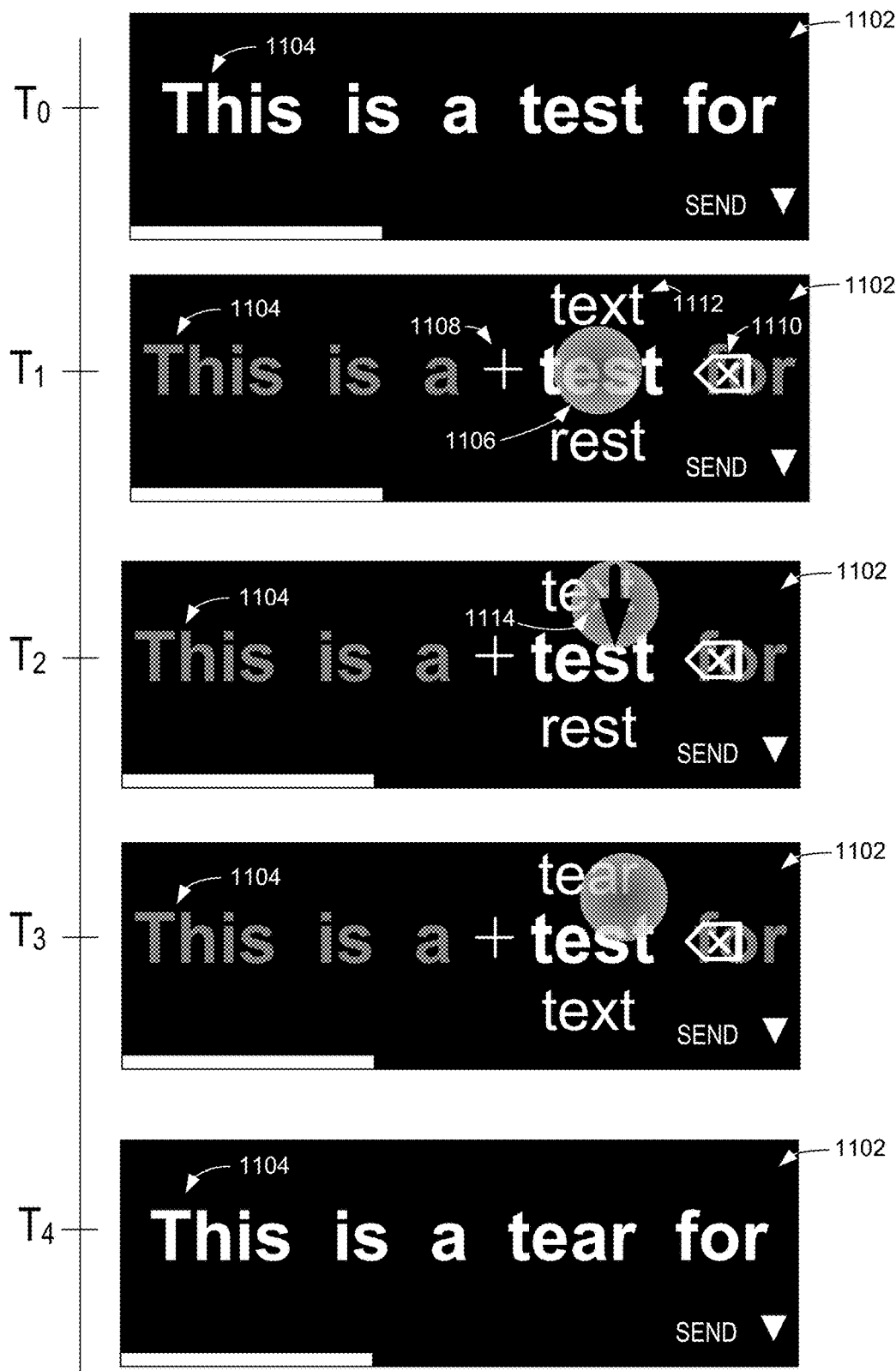
FIGS. 11-14 show text editing scenarios on a text-entry device.

FIGS. 11-15 illustrate example text editing scenarios and associated user interface states. Turning first to FIG. 11, an example scenario of replacing a recognized candidate word with an alternate candidate word is illustrated. At time $T_0$, a user interface 1102 includes a portion of a string of candidate text 1104. For example, the string of candidate text 1104 may include all recognized candidate words entered by a user in a text entry session (e.g., after initiation of the keyboard and prior to sending a message). At time $T_1$ (or some time period between $T_0$ and $T_1$), a selection of one of the candidate words in the string 1104 is input, as indicated by gesture indicator 1106 illustrated over the candidate word "test." As illustrated at time $T_1$, selection of a candidate word causes a plurality of user interface elements to be displayed. For example, an add word key 1108, a delete word key 1110, and alternate candidate words 1112 may be displayed. In some embodiments, the selected word may be differentiated from other words in the string by altering the display characteristics of the selected word and/or the other words in the string. For example, the other words in the string may be greyed out, faded, reduced in size, and/or otherwise less prominently displayed relative to the selected word. Additionally or alternatively, opposite effects may be applied to the selected word to increase the prominence of the selected word. For example, the selected word may remain the same color, be changed to a different (e.g., a brighter) color, increased in size, highlighted, and/or otherwise more prominently displayed than the other words in the string.

In the example illustrated in FIG. 11, alternate candidate words for the selected candidate word are presented above and below the selected candidate word. As shown at time $T_2$, a user may scroll through the alternate candidate words (e.g., as indicated by vertically-moving gesture indicator 1114) to view the alternate candidate words. At time $T_3$, the user selects a desired alternate candidate word (e.g., "tear") to replace the selected candidate word that appears in the string. As a result, at time $T_4$, the selected candidate word is replaced by the selected alternate candidate word. As illustrated, the selected alternate candidate word is not prominently displayed (e.g., the additional user interface items are not displayed and the other words in the string are no longer greyed out). In some embodiments, selection of an alternate candidate word may cause the alternate candidate word to swap places with the selected candidate word, such that the additional user interface items are still displayed and the alternate candidate word (now located within the string of candidate text) is prominently displayed relative to the other words in the string.

Figure 12:
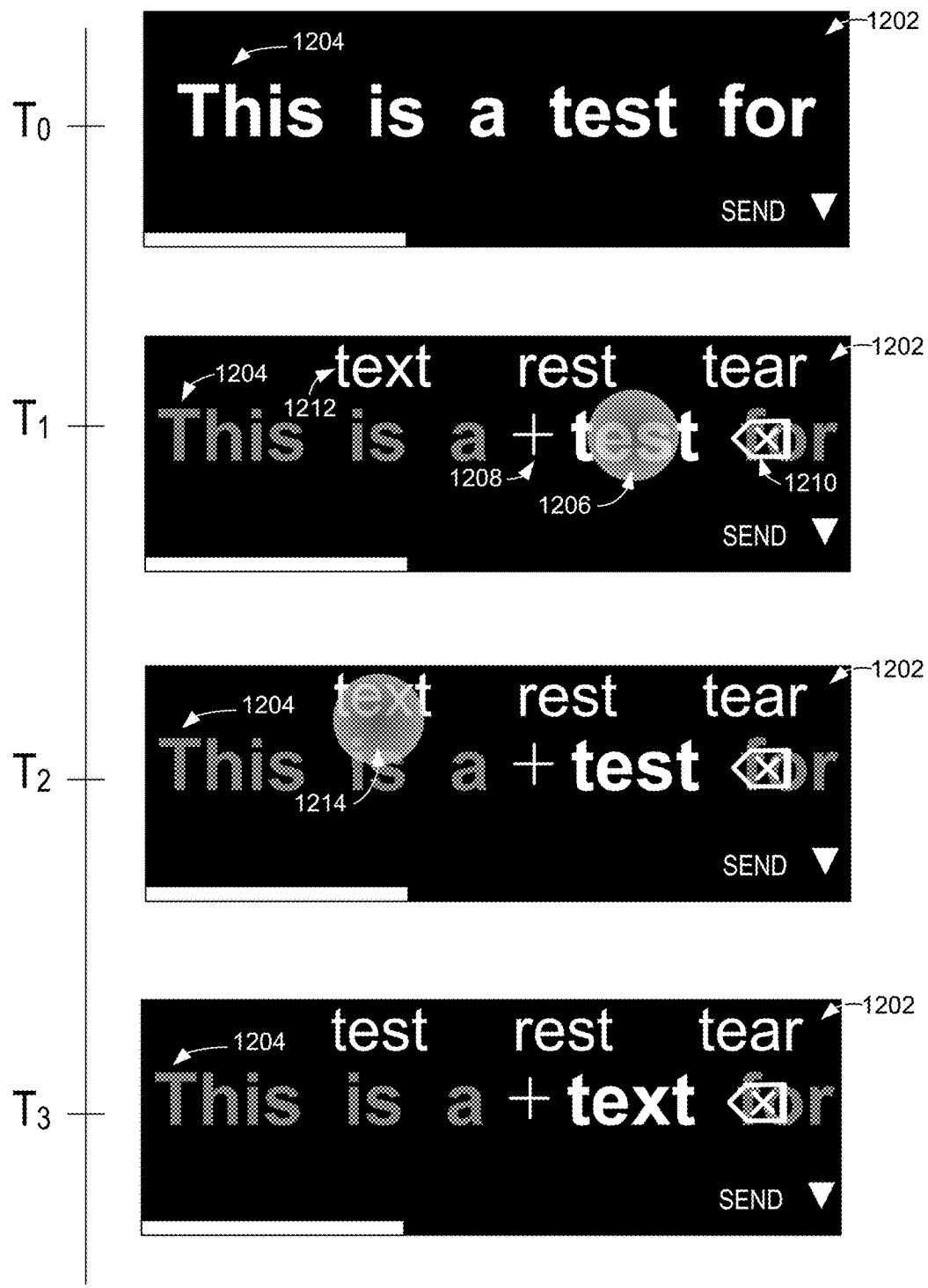

As described above, alternate candidate words 1112 may be presented above and below a selected candidate word, allowing a user to scroll through the list of alternate candidate words. In some embodiments, the height and/or touch sensing capabilities of a display may hinder the performance of such vertical scrolling gestures. FIG. 12 illustrates another example of presenting alternative candidate words. At time $T_0$, a viewable portion of user interface 1202 includes a portion of a string of candidate text 1204. At time $T_1$ (or some time between $T_0$ and $T_1$), a selection of one of the candidate words in the string 1204 is input, as indicated by feedback indicator 1206 illustrated over the candidate word "test." As illustrated at time $T_1$, selection of a candidate word causes a plurality of user interface elements to be displayed, including an add word key 1208, a delete word key 1210, and alternate candidate words 1212. In the example illustrated in FIG. 12, the alternate candidate words are displayed horizontally across a top of the selected candidate word. It is to be understood that the placement of the alternate candidate words is exemplary in nature, and the alternate candidate words may be displayed at any suitable location in the user interface.

In some examples, a predetermined number of alternate candidate words (e.g., the second through fourth most-likely alternate candidate words identified by a word-level recognizer) may be displayed. Depending on the modality, the source of the alternate candidate words may vary. For example, if the text was generated by speech recognition, acoustic speech recognition candidates (e.g., from a word confusion network) may be utilized in addition to language model candidates. In other embodiments, all alternate candidate words may be viewable by horizontally scrolling through the displayed list of alternate candidate words (e.g., by providing a horizontal swiping gesture along a top of the display). At time $T_2$, a user selects a desired alternate candidate word to replace the selected candidate word (e.g., as indicated by feedback indicator 1214). In response, at time $T_3$, the selected alternate candidate word replaces the selected candidate word.

Figure 13:
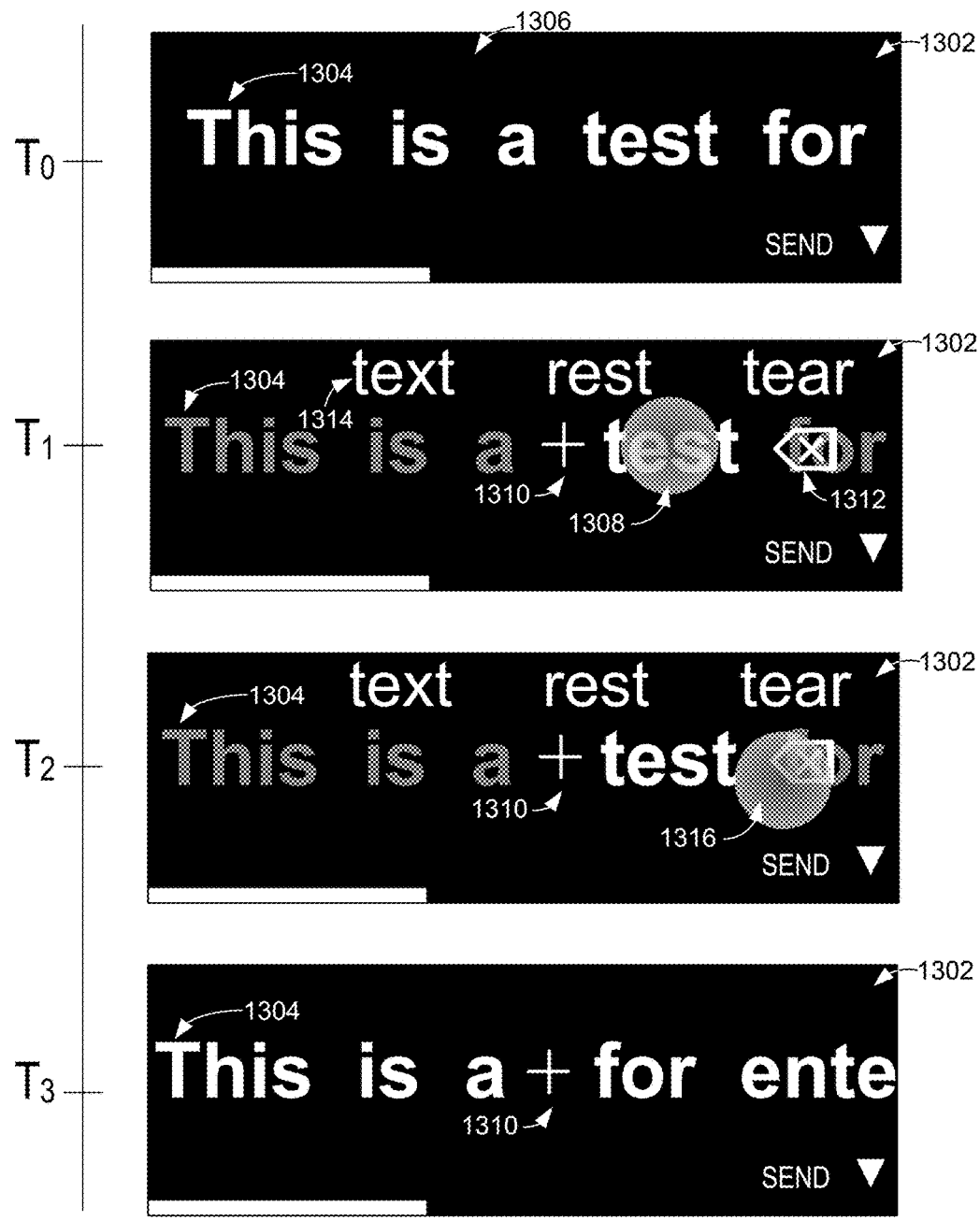

FIG. 13 illustrates an example scenario of deleting a word in a string of candidate text. At time $T_0$, a user interface 1302 includes a string 1304 that is displayed in a text editor 1306. At time $T_1$ (or some time between $T_0$ and $T_1$), a selection of one of the candidate words in the string 1304 is provided as input, indicated by feedback indicator 1308 illustrated over the candidate word "test." As illustrated at time $T_1$, selection of a candidate word causes a plurality of user interface elements to be displayed. For example, an add word key 1310, a delete word key 1312, and alternate candidate words 1314 may be displayed. At time $T_2$, delete word key 1312 is selected, as indicated by the feedback indicator 1316. As a result, at time $T_3$, the string of candidate text is presented without the selected candidate word (e.g., the word "test" is deleted). In some embodiments, the add word key 1310 may persist in the location of the deleted word in order to enable a user to quickly insert a word in the location of the deleted word.

Figure 14:
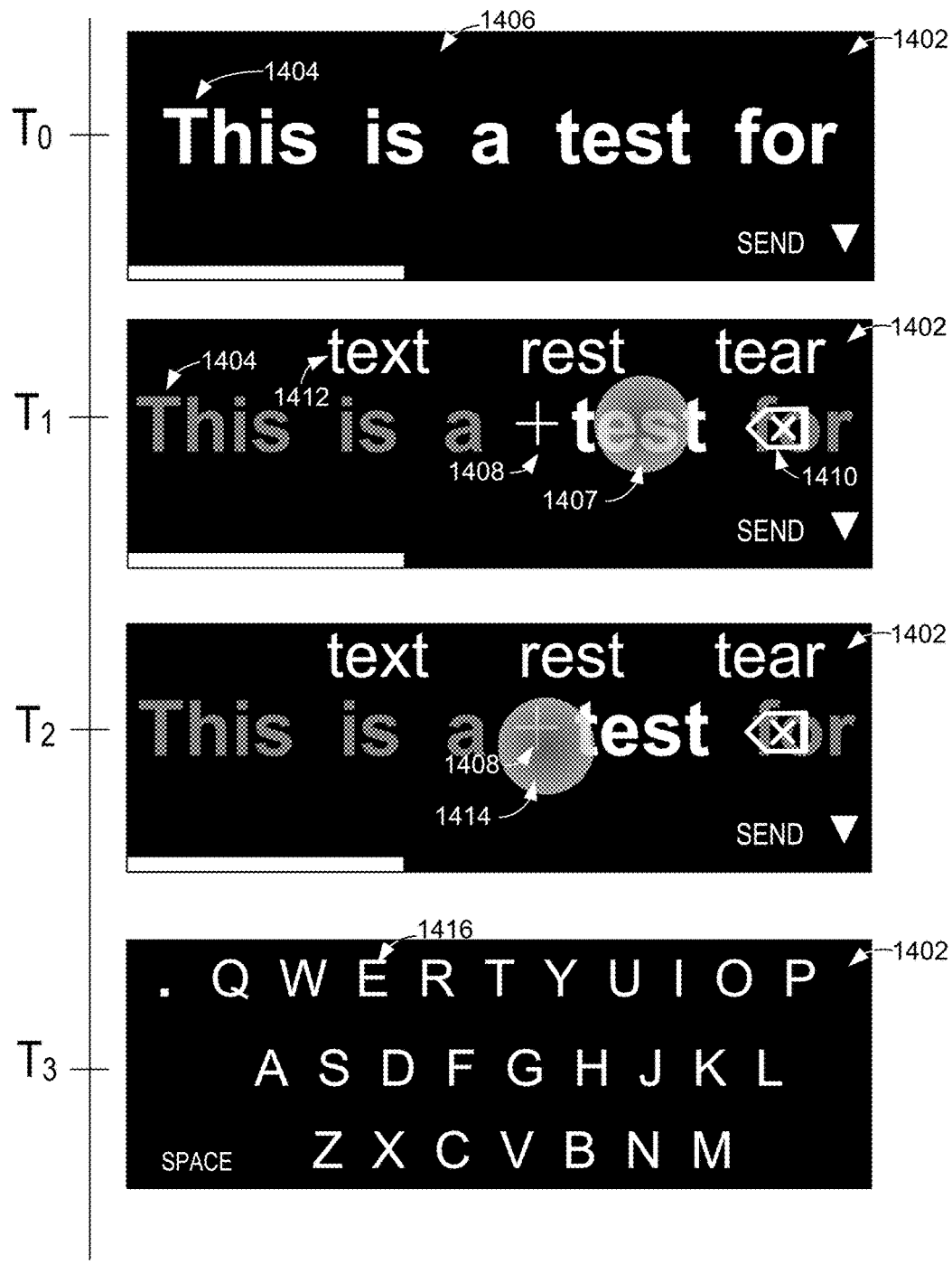

FIG. 14 illustrates an example scenario of adding a word in a string of candidate text. At time $T_0$, a user interface 1402 includes a string 1404 that is displayed in a text editor 1406. At time $T_1$ (or some time period between $T_0$ and $T_1$), a selection of one of the candidate words in the string 1404 is provided as input, indicated by feedback indicator 1407 illustrated over the candidate word "test." As illustrated at time $T_1$, selection of a candidate word causes a plurality of user interface elements to be displayed. For example, an add word key 1408, a delete word key 1410, and alternate candidate words 1412 may be displayed. At time $T_2$, add word key 1408 is selected, as indicated by the feedback indicator 1414. As a result, at time $T_3$, a virtual keyboard 1416 is displayed, enabling a user to begin entering characters to form a word to be inserted in front of the selected candidate word. In some embodiments, a keyboard layout selection or an input method selection may be presented to a user upon selection of the add word key 1408, enabling the user to select the manner in which the additional word is to be input.

Text/character entry may be input via mechanisms other than touch input on virtual keyboards. For example, the text-entry device may include a microphone to capture voice input, which may be processed to generate recognized candidate words locally or remotely (e.g., via an on-board voice recognition/speech-to-text module within the text-entry device and/or via an off-board voice recognition/speech-to-text module within a computing device located remotely from the text-entry device and communicating with the text-entry device over a communication link such as a wireless communication link). In examples where a remote computing device is utilized to perform voice recognition, raw and/or partially processed voice data may be transmitted from the text-entry device and received by the remote computing device. After performing the voice recognition/speech-to-text processing, the remote computing device may transmit candidate word(s) to the text-entry device.

In some examples, the text-entry device may send raw and/or partially processed voice data to an external computing device (e.g., a smartphone or other mobile computing device, which may be within direct communication range of the text-entry device). The external computing device may perform some or no processing on the received voice data prior to sending the received and/or further processed voice data to a remote service via a network (e.g., a cloud computing device located remotely from the text-entry device and the external computing device). The remote service may convert the voice data received from the external computing device to text and/or perform additional processing and then return the text and/or additionally processed voice data to the external computing device. The external computing device may then forward the text and/or additionally processed voice data to the text-entry device.

Figure 15:
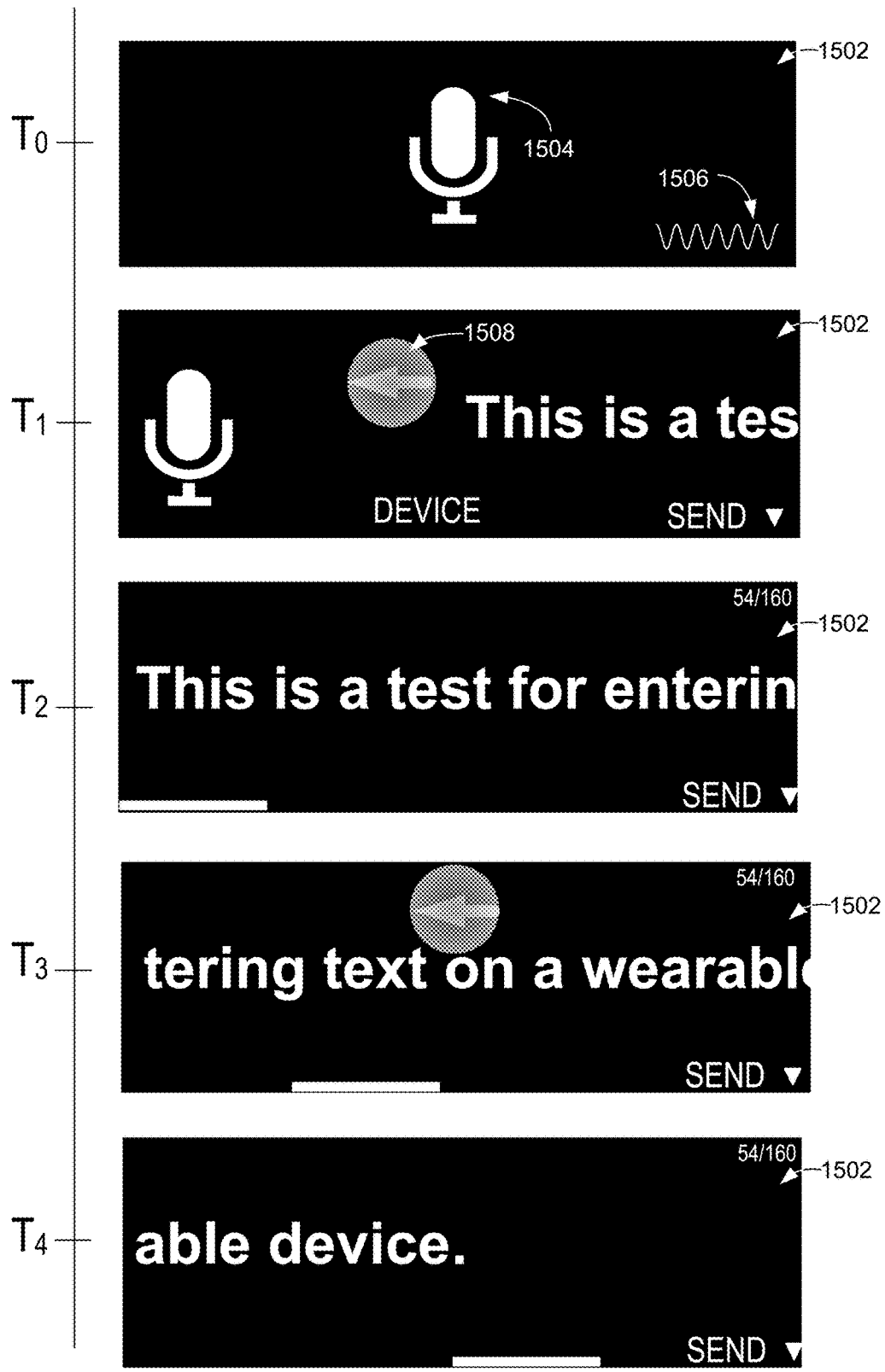
FIG. 15 shows an example text entry and editing scenario that utilizes voice input.

FIG. 15 illustrates an example of providing voice input. At time $T_0$, a user interface 1502 includes a microphone icon 1504 indicating that the user interface is accepting voice input. In a preview area 1506, a placeholder visually represents voice data that is being captured. At time $T_1$, a horizontal swiping gesture (e.g., as indicated by leftward moving feedback indicator 1508) is performed to transition the user interface from the voice input region/state to a text editor. As described above with respect to FIG. 9, a text editor of the user interface may be displayed at time $T_2$, including a string of recognized candidate text. At time $T_3$, the string may be dragged via a horizontal swiping gesture to enable viewing of additional text, and at time $T_4$, the end of the string may be viewable responsive to the horizontal swiping gesture. In some implementations, a voice command or another type of user input may be used to transition to the text editor.

The voice input mode of the user interface as described above may be entered from any suitable region of the user interface. For example, the voice input mode may be an additional option in the keyboard layout selection menu described in FIG. 6. The voice input mode may additionally or alternatively be accessed by swiping up or down while viewing a virtual keyboard, as described with respect to FIGS. 5A and 5B or by selecting an icon displayed while viewing a virtual keyboard. The voice input mode may additionally or alternatively be accessed within the text editor. For example, upon selection of a candidate word in a string of recognized candidate words, a key for providing voice input to replace the word may be displayed.

Additionally or alternatively, a handwriting, drawing, or shape-writing input mode may be selected via a displayed icon or menu option. The drawing input mode may enable a user to replace and/or enter characters/words by drawing directly on the display with a finger, stylus, or other input device. In some embodiments, characters or shapes may be drawn on a display orientation that is different than the display orientation used for the text editor (e.g., text may be drawn in a portrait orientation and the text editor may be in a landscape orientation). The drawing input may include one or more touch inputs (e.g., a series of continuous touch inputs, each continuous touch input forming or representing a character or a portion of a character) to the display. The touch inputs and/or data corresponding to the touch inputs may be analyzed by the computing device that includes the display and/or may be transmitted to a remote computing device for processing to determine characters or words that correspond to the drawing input.

The determined characters or words may be added to a string of entered text and displayed in the text editor upon completing a drawing input session (e.g., responsive to exiting the drawing input mode). In some examples, the drawing input mode may utilize delimiters similarly to the virtual keyboard in order to trigger character or word recognition. For example, lifting a finger, pausing (e.g., not touching the display or maintaining contact with a single point of the display) for a time that exceeds a threshold, selecting a user interface element (e.g., an "end drawing mode" user interface element), or other delimiter input (e.g., a tap, a swipe gesture, and/or another suitable input) may trigger the character or word recognition of touch inputs received since a last delimiter input or the start of the drawing mode.

Figure 16:
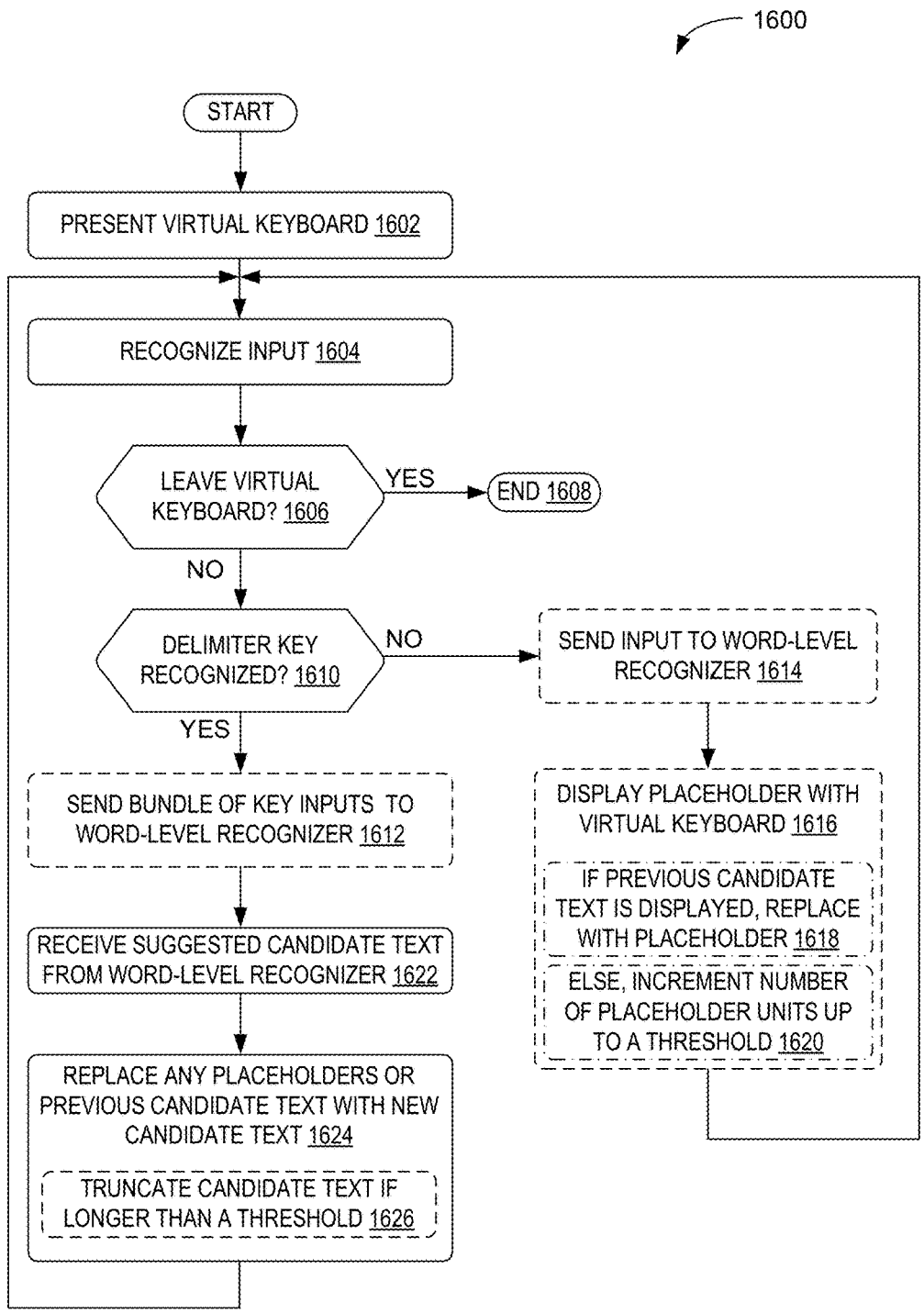
FIG. 16 is a flow chart of an example method of text entry.

FIG. 16 shows a method 1600 of recognizing text input. Method 1600 may be performed by wrist-wearable computing device 100 of FIG. 1 or any other text-entry device capable of displaying a virtual keyboard.

At 1602, method 1600 includes presenting a virtual keyboard. As discussed above, the virtual keyboard may be presented to occupy substantially an entire display, thus allowing each key of the virtual keyboard to be as large as the display allows.

At 1604, method 1600 includes recognizing input. Such input may include key strokes (e.g., tap input) on the virtual keyboard, voice input, gaze input, gesture input, hardware button presses, or any other type of input recognizable by the text-entry device.

At 1606, if the recognized input is a command to leave the virtual keyboard, the method ends at 1608. Such a command may be a swipe or other input to toggle to a text editor, open another application, turn the text-entry device off, or perform another operation. If the recognized input is not a command to leave the virtual keyboard, the method advances to 1610.

At 1610, if the recognized input is a delimiter key, the method proceeds to 1612. If the recognized input is not a delimiter key, the method proceeds to 1614, where the detected input is optionally sent to an on-board or off-board word-level recognizer. As discussed below with reference to 1612, instead of sending each input after each input recognition, a plurality of inputs between successive delimiters may be bundled and sent together.

At 1616, method 1600 optionally includes displaying a placeholder with the virtual keyboard. When a placeholder is displayed, it may be an asterisk, bullet, or any other generic symbol that signals that a key has been input, but without distracting the user with a potentially wrong key. In some implementations, an actual letter or other symbol corresponding to the particular input may be used instead. The placeholder may be displayed responsive to the input not selecting any of the delimiter keys.

As indicated at 1618, the placeholder may replace a displayed word that corresponds to input before the last delimiter (i.e., the previous word). As indicated at 1620, a plurality of placeholders may be displayed together, such that each new input before a delimiter will add a new placeholder. In this way, the user can see that each touch input is being recognized. In some implementations, only a threshold number of placeholders will be displayed (e.g., the number of placeholders that will fit on the display without altering the virtual keyboard size or position). In some implementations, the placeholders and/or other aspects of the virtual keyboard page can flash or otherwise visually indicate when touch input is recognized. In some implementations, haptic feedback and/or other mechanisms may be used to signal touch input recognition to the user.

At 1612, method 1600 optionally includes bundling all key inputs between successive delimiter inputs and sending the bundle to an on-board or off-board word-level recognizer. Such bundling may reduce the number of communications necessary to convey the input, for example. Alternatively, as discussed above with reference to 1614, each input may be sent individually.

At 1622, method 1600 includes receiving a suggested candidate text from the word-level recognizer. At 1624, the received suggested candidate text is displayed with the virtual keyboard. This new suggested candidate text replaces any candidate text from a previous word or any placeholder(s) for the current word (e.g., all currently displayed placeholders) responsive to the input selecting one of the delimiter keys. In this way, at most one word is displayed with the keyboard at any given time. As such, the keyboard need not be made smaller to accommodate a larger area for displaying entered text with the virtual keyboard. As indicated at 1626, the displayed candidate text may be truncated so that a portion of a displayed word bleeds off the edge of the display. Alternatively, a size of the candidate text may be reduced so that an entire word fits on the display with the virtual keyboard.

In some examples, in addition to or as an alternative to replacing placeholders with the candidate text, the new suggested candidate text may be temporarily displayed over the keyboard. For example, the new suggested candidate text may be displayed over the keyboard in a semi-transparent manner and/or the keyboard may be faded (e.g., in a similar manner to the fading described above with respect to times $T_0$-$T_3$ in FIG. 3) during display of the new suggested candidate text. The new suggested candidate text may have a uniform size, regardless of the number of characters in the text (e.g., resulting in selective truncation as described above with respect to the text replacing the placeholders) in some examples. In other examples, the candidate text may be zoomed/stretched and/or shrunk to fit the screen size.

The methods and processes described herein are tied to a computing system of one or more computing devices. In particular, such methods and processes may be implemented as a computer-application program or service, an application-programming interface (API), a library, and/or other computer-program product.

Figure 17:
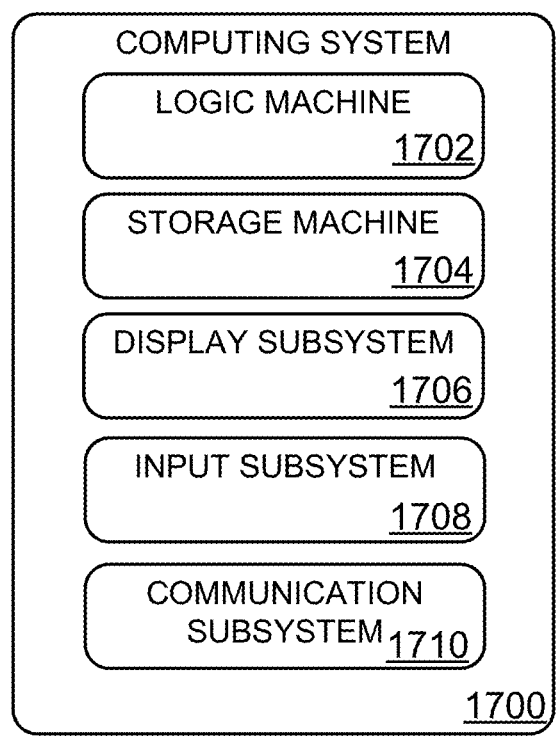
FIG. 17 shows an example text-editing computing device.

FIG. 17 schematically shows a non-limiting embodiment of a computing system 1700 that can enact one or more of the methods and processes described above. Computing system 1700 is shown in simplified form. Computing system 1700 may take the form of one or more text-entry devices and or cooperating computing devices, which may take the form of wearable computing devices, mobile computing devices, mobile communication devices (e.g., smart phone), personal computers, server computers, tablet computers, home-entertainment computers, network computing devices, gaming devices, and/or other computing devices.

Computing system 1700 includes a logic machine 1702 and a storage machine 1704. Computing system 1700 may optionally include a display subsystem 1706, input subsystem 1708, communication subsystem 1710, and/or other components not shown in FIG. 17.

Logic machine 1702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1704 includes one or more physical devices configured to hold instructions executable by the logic machine to implement the methods and processes described herein. When such methods and processes are implemented, the state of storage machine 1704 may be transformed—e.g., to hold different data.

Storage machine 1704 may include removable and/or built-in devices. Storage machine 1704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1704 may include volatile, nonvolatile, dynamic, static, read/write, read-only, random-access, sequential-access, location-addressable, file-addressable, and/or content-addressable devices.

It will be appreciated that storage machine 1704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1702 and storage machine 1704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1700 implemented to perform a particular function. In some cases, a module, program, or engine may be instantiated via logic machine 1702 executing machine-readable instructions held by storage machine 1704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1706 may be used to present a visual representation of data held by storage machine 1704. This visual representation may take the form of a graphical user interface (GUI). As the herein described methods and processes change the data held by the storage machine, and thus transform the state of the storage machine, the state of display subsystem 1706 may likewise be transformed to visually represent changes in the underlying data. Display subsystem 1706 may include one or more display devices utilizing virtually any type of technology. Such display devices may be combined with logic machine 1702 and/or storage machine 1704 in a shared enclosure, or such display devices may be peripheral display devices.

When included, input subsystem 1708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1710 may be configured to communicatively couple computing system 1700 with one or more other computing devices. Communication subsystem 1710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1700 to send and/or receive messages to and/or from other devices via a network such as the Internet.

An example provides a method of providing a user interface on a computing device, the method comprising presenting a virtual keyboard on a display of the computing device, detecting input to the virtual keyboard, and, for each detected input, determining whether the input selects any of one or more delimiter keys, displaying a placeholder for the input responsive to the input not selecting any of the one or more delimiter keys, and receiving suggested candidate text from a word-level recognizer and replacing all currently displayed placeholders with the suggested candidate text responsive to the input selecting any of the one or more delimiter keys. In such an example, each detected input may additionally or alternatively be sent to the word-level recognizer responsive to detecting the input to the virtual keyboard. In such an example, the computing device may additionally or alternatively be a first computing device, and the word-level recognizer may additionally or alternatively be included in a second computing device, remote from the first computing device and communicating with the first computing device via a wireless communication link. In such an example, displaying the placeholder for the input may additionally or alternatively comprise incrementing a number of placeholders displayed if a maximum number of placeholders are not displayed and maintaining the number of placeholders displayed if the maximum number of placeholders are displayed. In such an example, detecting input to the virtual keyboard may additionally or alternatively comprise detecting tap inputs to the virtual keyboard, and the method may additionally or alternatively comprise detecting a slide input and transitioning from displaying the virtual keyboard to displaying a different portion of the user interface responsive to the slide input. In such an example, displaying the different portion of the user interface may additionally or alternatively comprise displaying a keyboard selection menu. In such an example, displaying the different portion of the user interface may additionally or alternatively comprise displaying a text editor, the text editor presenting a list of previously-received suggested candidate text. In such an example, transitioning from displaying the virtual keyboard to displaying the different portion of the user interface may additionally or alternatively comprise shifting a portion of the virtual keyboard out of a displayable region of the user interface and shifting the different portion of the user interface into the displayable region of the user interface. In such an example, replacing all currently displayed placeholders with the suggested candidate text may additionally or alternatively comprise showing only a portion of the candidate text on a displayable region of the user interface if a length of the candidate text is greater than a threshold. Any or all of the above-described examples may be combined in any suitable manner in various implementations.

Another example provides a computing device comprising a touch display device having a top edge and a bottom edge, a logic machine, and a storage machine. In such an example, the storage machine may hold instructions executable by the logic machine to present a virtual keyboard on the touch display without a previously-entered text-editing area between the virtual keyboard and the top edge and without a text-editing area between the virtual keyboard and the bottom edge, generate recognized words based on input to the virtual keyboard, and, responsive to a show-text-editor input, transition from displaying the virtual keyboard to displaying a text editor without the virtual keyboard, the text editor presenting the recognized words. In such an example, the transition may additionally or alternatively comprise a panning of the user interface, and a portion of the virtual keyboard may additionally or alternatively be displayed alongside a portion of the text editor in a displayable region of the user interface during the transition. In such an example, presenting the virtual keyboard may additionally or alternatively comprise presenting a top row of keys of the virtual keyboard in a top third of the touch display device, presenting a middle row of keys of the virtual keyboard in a middle third of the touch display device, and presenting a bottom row of keys of the virtual keyboard in a bottom third of the touch display device. In such an example, generating recognized words based on input to the virtual keyboard may additionally or alternatively comprise detecting input to the virtual keyboard, and, for each detected input, determining whether the input selects any of one or more delimiter keys, displaying a placeholder for the input responsive to the input not selecting any of the one or more delimiter keys, and receiving suggested candidate text from a word-level recognizer and replacing all currently displayed placeholders with the suggested candidate text responsive to the input selecting any of the one or more delimiter keys. In such an example, each detected input may additionally or alternatively be sent to the word-level recognizer responsive to detecting the input to the virtual keyboard. In such an example, the word-level recognizer may additionally or alternatively be included in a remote computing device, and the remote computing device may additionally or alternatively communicate with the computing device via a wireless communication link. In such an example, displaying the placeholder for the input may additionally or alternatively comprise incrementing a number of placeholders displayed if a maximum number of placeholders are not displayed and maintaining the number of placeholders displayed if the maximum number of placeholders are displayed. In such an example, the show-text-editor input may additionally or alternatively comprise a slide input. In such an example, the computing device may additionally or alternatively comprise a microphone, and recognized words may additionally or alternatively be generated responsive to voice input detected by the microphone. Any or all of the above-described examples may be combined in any suitable manner in various implementations.

Another example provides a wrist-wearable computing device comprising a touch display device having a top edge and a bottom edge, a logic machine, and a storage machine. The storage machine may hold instructions executable by the logic machine to present a virtual keyboard on the touch display without a previously-entered text-editing area between the virtual keyboard and the bottom edge, detect input to the virtual keyboard, and, for each detected input, determine whether the input selects any of one or more delimiter keys, display a placeholder for the input responsive to the input not selecting any of the one or more delimiter keys, and receive suggested candidate text from a word-level recognizer and replacing all currently displayed placeholders with the suggested candidate text responsive to the input selecting any of the one or more delimiter keys. The storage machine may additionally or alternatively hold instructions executable by the logic machine to, responsive to a show-text-editor input, transition from displaying the virtual keyboard to displaying a text editor without the virtual keyboard, the text editor presenting previously-entered text formed from previously-received suggested candidate text. In such an example, each detected input may additionally or alternatively be sent to the word-level recognizer responsive to detecting the input to the virtual keyboard. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a touch display device having a top edge and a bottom edge;
a logic machine; and
a storage machine holding instructions executable by the logic machine to:
present a virtual keyboard on the touch display device without presenting any keyboard-entered text in an area between a top of the virtual keyboard and the top edge;
receive input to the virtual keyboard without presenting keyboard-entered text in the area between the top of the virtual keyboard and the top edge;
generate a plurality of recognized words based on the input to the virtual keyboard; and
transition from presenting the virtual keyboard to presenting the plurality of recognized words without the virtual keyboard.

2. The computing device of claim 1, wherein the transition comprises a panning of a user interface including the virtual keyboard, and wherein a portion of the virtual keyboard is displayed alongside a portion of the plurality of recognized words in a displayable region of the user interface during the transition.

3. The computing device of claim 1, wherein presenting the virtual keyboard comprises presenting a top row of keys of the virtual keyboard in a top third of the touch display device, presenting a middle row of keys of the virtual keyboard in a middle third of the touch display device, and presenting a bottom row of keys of the virtual keyboard in a bottom third of the touch display device.

4. The computing device of claim 1, wherein generating the plurality of recognized words based on input to the virtual keyboard comprises:
detecting input to the virtual keyboard; and
for each detected input:
determining whether the input selects any of one or more delimiter keys;
displaying only a generic placeholder for the input responsive to the input not selecting any of the one or more delimiter keys; and
receiving suggested candidate text from a word-level recognizer and replacing all currently displayed generic placeholders with the suggested candidate text responsive to the input selecting any of the one or more delimiter keys.

5. The computing device of claim 4, wherein additional recognized words are generated responsive to drawing or shape-writing input to the touch display device during a drawing input mode.

6. The computing device of claim 4, wherein the word-level recognizer is included in a remote computing device, the remote computing device communicating with the computing device via a wireless communication link.

7. The computing device of claim 4, wherein displaying the generic placeholder for the input comprises incrementing a number of generic placeholders displayed if a maximum number of generic placeholders are not displayed and maintaining the number of generic placeholders displayed if the maximum number of generic placeholders are displayed.

8. The computing device of claim 1, wherein a slide input triggers the transition from presenting the virtual keyboard to presenting the plurality of recognized words without the virtual keyboard.

9. The computing device of claim 1, wherein the computing device further comprises a microphone, and wherein recognized words are generated responsive to voice input detected by the microphone.

10. A wrist-wearable computing device comprising:
a touch display device having a top edge and a bottom edge;
a logic machine; and
a storage machine holding instructions executable by the logic machine to:
present a virtual keyboard on the touch display device without presenting any keyboard-entered text in an area between a top of the virtual keyboard and the top edge;
detect input to the virtual keyboard without presenting keyboard-entered text in the area between the top of the virtual keyboard and the top edge;
for each detected input:
determine whether the input selects any of one or more delimiter keys;
display only a generic placeholder without displaying a non-generic character for the input responsive to the input not selecting any of the one or more delimiter keys;
receive suggested candidate text from a word-level recognizer;
replace all currently displayed generic placeholders with the suggested candidate text responsive to the input selecting any of the one or more delimiter keys; and
transition from presenting the virtual keyboard to presenting the suggested candidate text without the virtual keyboard.

11. The wrist-wearable computing device of claim 10, wherein the instructions are further executable to temporarily display the suggested candidate text over the virtual keyboard responsive to the input selecting any of the one or more delimiter keys.

12. A method of providing a user interface on a computing device, the method comprising:
presenting a virtual keyboard on a touch display device of the computing device without presenting any keyboard-entered text in an area between a top of the virtual keyboard and a top edge of the touch display device;
receiving input to the virtual keyboard without presenting keyboard-entered text in the area between the top of the virtual keyboard and the top edge;
generating a plurality of recognized words based on the input to the virtual keyboard; and
transitioning from presenting the virtual keyboard to presenting the plurality of recognized words without the virtual keyboard on the touch display device.

13. The method of claim 12, wherein transitioning comprises a panning of a user interface including the virtual keyboard, and wherein a portion of the virtual keyboard is displayed alongside a portion of the plurality of recognized words in a displayable region of the user interface during the transition.

14. The method of claim 12, wherein presenting the virtual keyboard comprises presenting a top row of keys of the virtual keyboard in a top third of the touch display device, presenting a middle row of keys of the virtual keyboard in a middle third of the touch display device, and presenting a bottom row of keys of the virtual keyboard in a bottom third of the touch display device.

15. The method of claim 12, wherein generating the plurality of recognized words based on input to the virtual keyboard comprises:
for each received input:
determining whether the input selects any of one or more delimiter keys;
displaying only a generic placeholder for the input responsive to the input not selecting any of the one or more delimiter keys;
receiving suggested candidate text from a word-level recognizer based on the input; and
presenting the suggested candidate text responsive to the input selecting any of the one or more delimiter keys.

16. The method of claim 15, wherein additional recognized words are generated responsive to drawing or shape-writing input to the touch display device during a drawing input mode.

17. The method of claim 15, wherein the word-level recognizer is included in a remote computing device, the remote computing device communicating with the computing device via a wireless communication link.

18. The method of claim 15, wherein displaying the generic placeholder for the input comprises incrementing a number of generic placeholders displayed if a maximum number of generic placeholders are not displayed and maintaining the number of generic placeholders displayed if the maximum number of generic placeholders are displayed.

19. The method of claim 12, wherein a slide input triggers transition from presenting the virtual keyboard to presenting the plurality of recognized words.

20. The method of claim 12, wherein the computing device further comprises a microphone, and wherein recognized words are generated responsive to voice input detected by the microphone.

* * * * *